United States Patent
Sano et al.

(10) Patent No.: US 9,863,405 B2
(45) Date of Patent: Jan. 9, 2018

(54) CIRCULATORY OSMOTIC PRESSURE ELECTRIC POWER GENERATION SYSTEM AND METHOD, PHASE CONTROL METHOD FOR WORKING MEDIUM, AND WORKING MEDIUM FOR CIRCULATORY OSMOTIC PRESSURE ELECTRIC POWER GENERATION

(71) Applicant: KABUSHIKI KAISHA TOSHIBA, Minato-ku, Tokyo (JP)

(72) Inventors: Kenji Sano, Tokyo (JP); Toshihiro Imada, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 371 days.

(21) Appl. No.: 14/615,757

(22) Filed: Feb. 6, 2015

(65) Prior Publication Data

US 2015/0249378 A1 Sep. 3, 2015

(30) Foreign Application Priority Data

Feb. 28, 2014 (JP) .................... 2014-038626

(51) Int. Cl.
*B01D 61/00* (2006.01)
*F03G 7/04* (2006.01)
(Continued)

(52) U.S. Cl.
CPC ............. *F03G 7/04* (2013.01); *B01D 61/002* (2013.01); *B01D 61/005* (2013.01);
(Continued)

(58) Field of Classification Search
CPC combination set(s) only.
See application file for complete search history.

(56) References Cited

U.S. PATENT DOCUMENTS 6,391,205 B1 5/2002 McGinnis
2005/0016924 A1 1/2005 DeVoe
(Continued)

FOREIGN PATENT DOCUMENTS

CN 1156988 A 8/1997
CN 1836105 A 9/2006
(Continued)

OTHER PUBLICATIONS

Jeffrey R. McCutcheon, et al., "A Novel Ammonia-Carbon Dioxide Forward (Direct) Osmosis Desalination Process," Desalination, 174, pp. 1-11, (2005).

(Continued)

*Primary Examiner* — David C Mellon
(74) *Attorney, Agent, or Firm* — Finnegan, Henderson, Farabow, Garrett & Dunner, L.L.P.

(57) ABSTRACT

An embodiment provides a working medium to be used in a circular osmotic pressure electric power generation system. The working medium comprises water and an inducing-liquid. The working medium, under conditions of a temperature of 5° C. to 35° C. and a pressure of 1 atmosphere, is in (1) a state of a liquid-liquid mutually dissolved two-component mixed solution when a concentration of the water or the inducing-liquid in the total amount of the water and the inducing-liquid is 10% by weight or lower, and (2) a state of being separated into the water phase and the inducing-liquid phase when the concentration of the water or the inducing-liquid in the total amount of the water and the inducing-liquid is higher than 10% by weight.

1 Claim, 16 Drawing Sheets

(51) Int. Cl.
*F03B 17/06* (2006.01)
*B01D 63/08* (2006.01)

(52) U.S. Cl.
CPC ............ *B01D 63/082* (2013.01); *F03B 17/06* (2013.01); *F05B 2210/13* (2013.01); *Y02E 10/28* (2013.01)

(56) References Cited

U.S. PATENT DOCUMENTS

| | | |
|---|---|---|
| 2006/0225420 A1 | 10/2006 | Al-Mayahi et al. |
| 2008/0169723 A1* | 7/2008 | Thorsen ............... B01D 61/002 310/300 |
| 2010/0024423 A1 | 2/2010 | McGinnis et al. |
| 2010/0183903 A1 | 7/2010 | McGinnis et al. |
| 2012/0111794 A1 | 5/2012 | Al-Jlil |
| 2014/0110328 A1 | 4/2014 | Doi et al. |

FOREIGN PATENT DOCUMENTS

| | | |
|---|---|---|
| CN | 1853044 A | 10/2006 |
| CN | 101573173 A | 11/2009 |
| CN | 202228252 A | 5/2012 |
| CN | 202811178 U | 3/2013 |
| JP | 2003-176775 | 6/2003 |
| JP | 2007-533884 | 11/2007 |
| JP | 2010-509540 | 3/2010 |
| JP | 2010-162527 | 7/2010 |
| JP | 4546473 | 9/2010 |
| JP | 2012-41849 | 3/2012 |
| JP | 2012-511118 | 5/2012 |
| JP | 2012-250200 A | 12/2012 |
| JP | 2013-13888 | 1/2013 |
| JP | 2013-116432 | 6/2013 |
| WO | WO 96/31436 A1 | 10/1996 |
| WO | WO 2005/017352 A1 | 2/2005 |
| WO | WO 2008/060435 A2 | 5/2008 |
| WO | WO 2012/084960 A1 | 6/2012 |

OTHER PUBLICATIONS

Robert L. McGinnis et al., "A Novel Ammonia-Carbon Dioxide Osmotic Heat Engine for Power Generation," Journal of Membrane Science, 305, pp. 13-19, (2007).

* cited by examiner

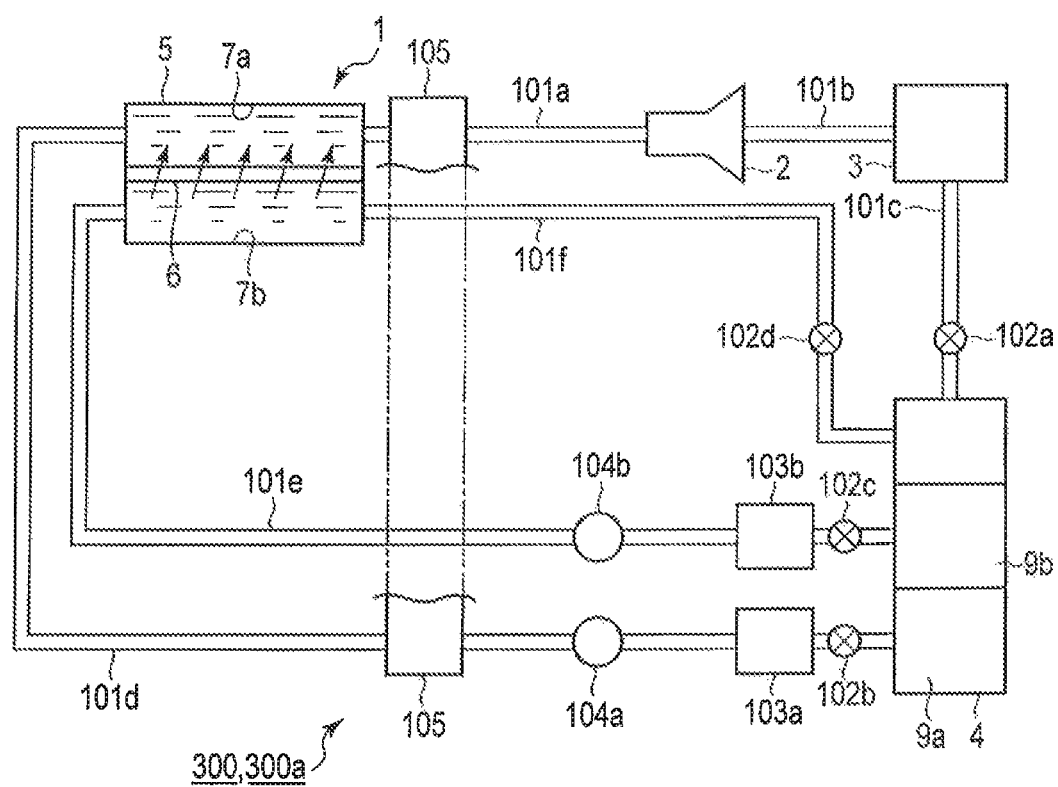
F I G. 11

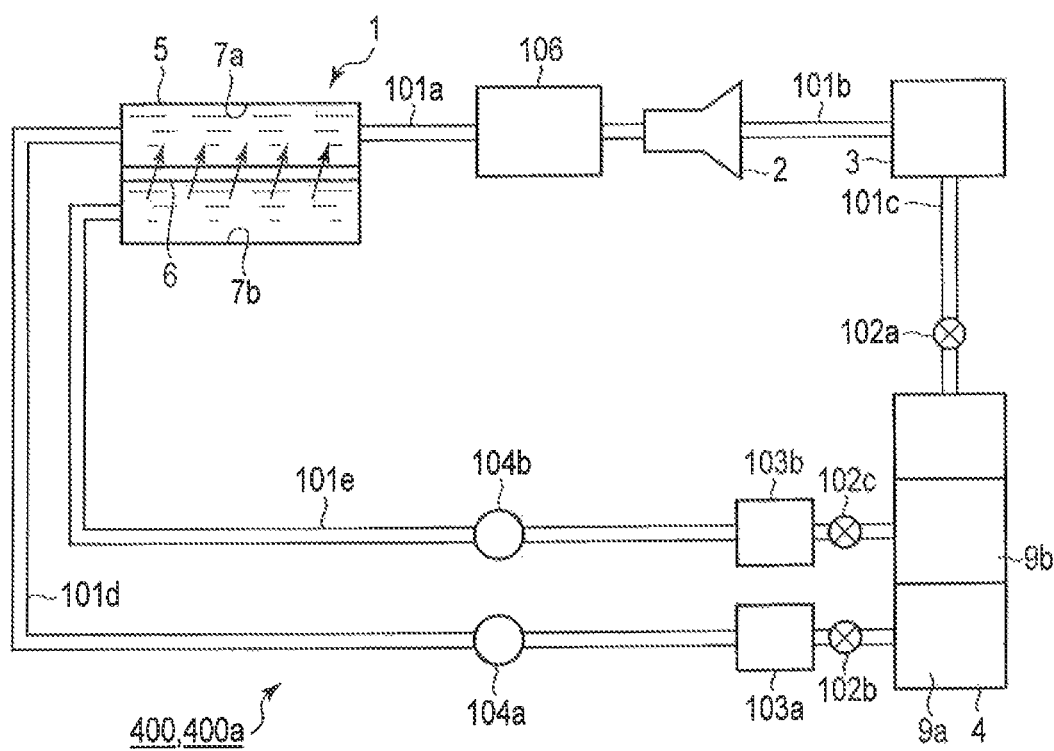
F I G. 12

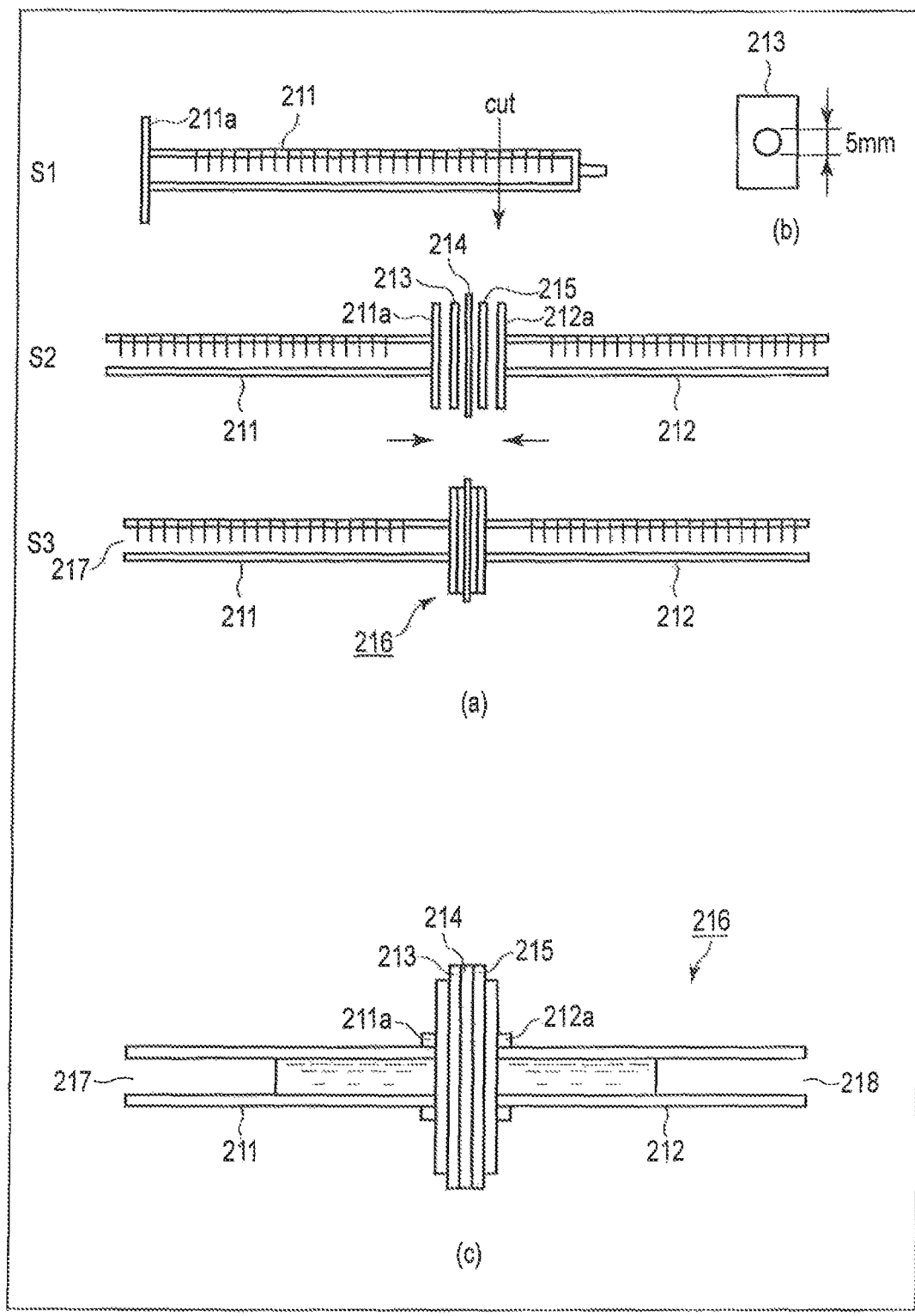
F I G. 14

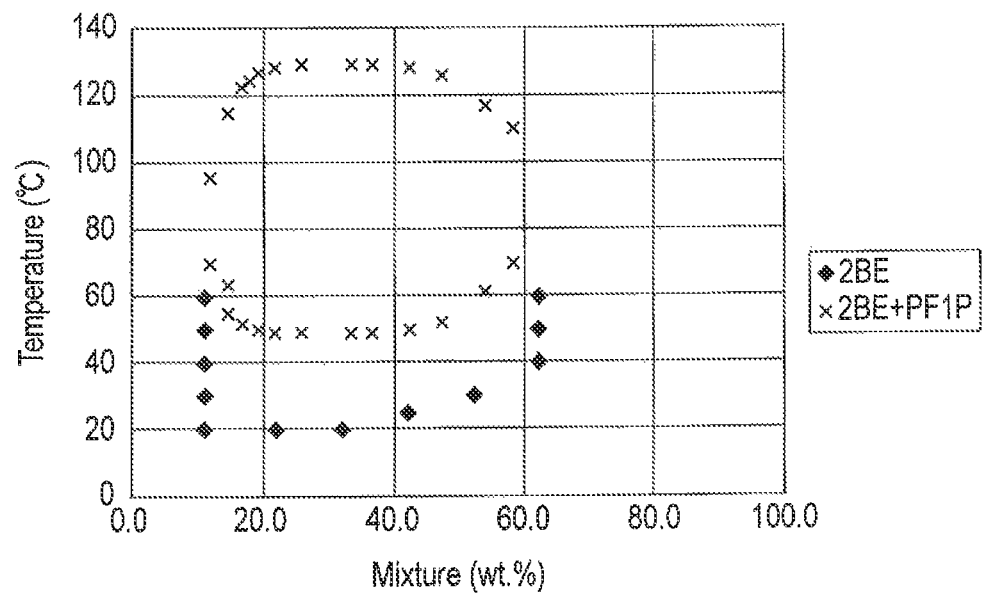
F I G. 18
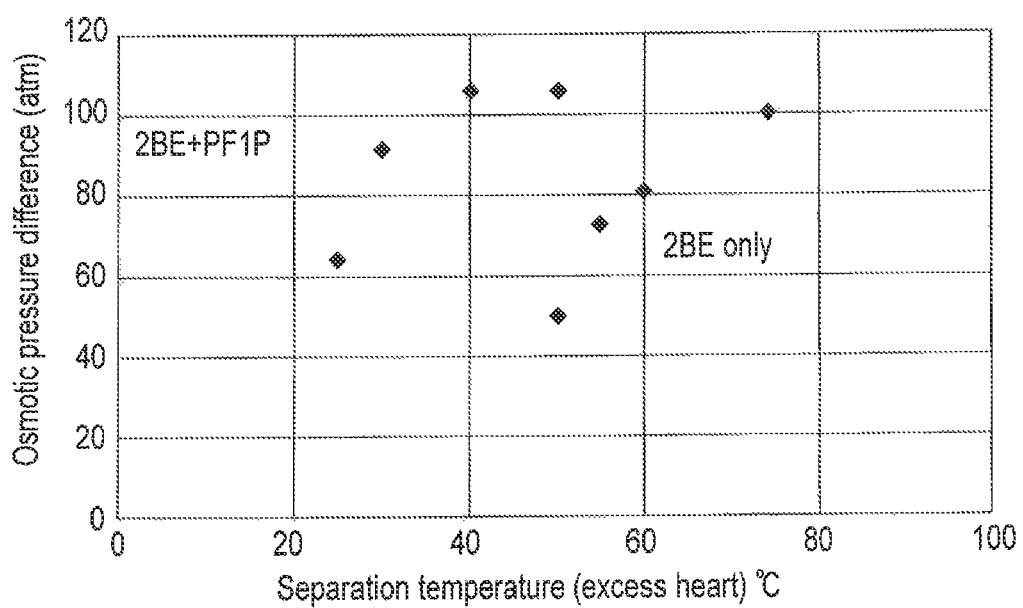
F I G. 19

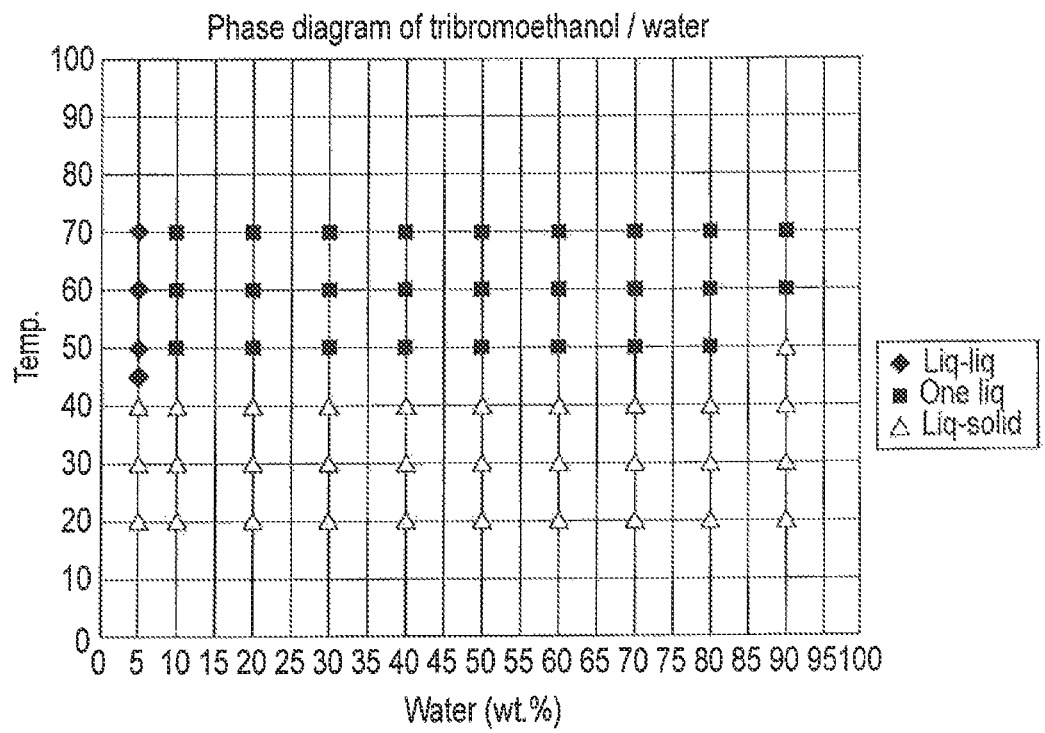
F I G. 22
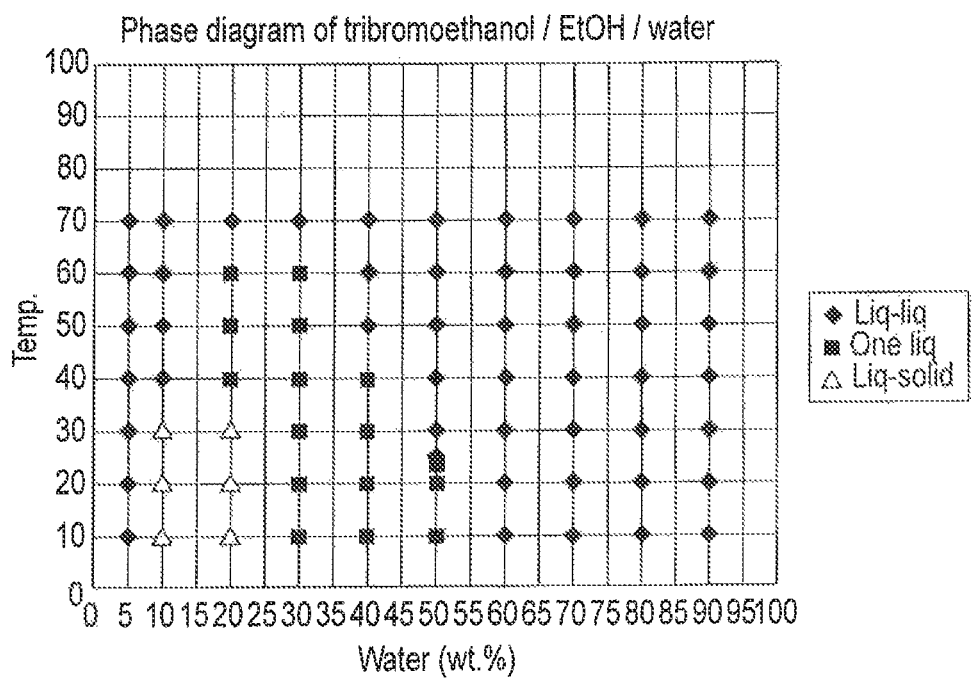
F I G. 23

CIRCULATORY OSMOTIC PRESSURE ELECTRIC POWER GENERATION SYSTEM AND METHOD, PHASE CONTROL METHOD FOR WORKING MEDIUM, AND WORKING MEDIUM FOR CIRCULATORY OSMOTIC PRESSURE ELECTRIC POWER GENERATION

CROSS-REFERENCE TO RELATED APPLICATIONS

This application is based upon and claims the benefit of priority from Japanese Patent Application No. 2014-038626, filed Feb. 28, 2014, the entire contents of which are incorporated herein by reference.

FIELD

Embodiments described herein relate to a working medium for circulatory osmotic pressure electric power generation, a circulatory osmotic pressure electric power generation system and a method thereof, and a method of controlling the phase of the working medium.

BACKGROUND

When a solution having low concentration and another solution having high concentration are separated by an osmosis membrane (semi-permeable membrane), the solvent of the solution of low concentration permeate through the osmosis membrane to move to the side of the solution having high concentration. An osmotic pressure electric power generation apparatus which generates electric power by rotating the turbine by utilizing this solvent movement phenomenon is known.

There is another type of osmotic pressure electric power generation apparatus, which generates electric power by circulating a working medium within a closed system. For example, an electric power generation apparatus is known, which uses an aqueous solution of ammonium carbonate as a working medium. In this apparatus, the turbine is rotated by water flow created by the difference in osmotic pressure between two types of aqueous solutions of ammonium carbonate having different concentrations from each other. The portions of the ammonium carbonate aqueous solutions used to rotate the turbine are heated for reuse and are separated into gaseous carbon dioxide and gaseous ammonia, and an aqueous solution of ammonium carbonate having a very low concentration. The separated gaseous carbon dioxide and ammonia are reintroduced into water, thus obtaining an aqueous solution of ammonium carbonate having a very high concentration. Therefore, the two types of aqueous solutions of ammonium carbonate having different concentrations thus obtained are re-circulated and used for electric power generation.

Ammonium carbonate has such a good solubility that 100 g of ammonium carbonate dissolves into 100 mL if water at room temperature. With this solubility, it is possible to obtain an osmotic pressure of such a degree that fresh water can be filtered out from sea water (3.5% by weight). Also, ammonium carbonate decomposes at such a low temperature as 60° C. into a gaseous carbonate and gaseous ammonia. An osmotic pressure electric power generation apparatus which uses an ammonium carbonate aqueous solution generates electric power while sending the aqueous solution pressurized by a positive osmotic pressure to its turbine. Here, it is possible to obtain such a high pressure of 250 atmospheres as the osmotic pressure. This is reported as about 10 times high as the pressure involved in the osmotic pressure electric power generation which uses the osmotic pressure of sea water.

On the other hand, in the electric power generation which utilizes the positive osmotic pressure by ammonium carbonate, poisonous and corrosive gaseous ammonia is produced. The production of gaseous ammonia causes degradation within the system and greatly affects the running cost. Further, ammonium carbonate is easy to precipitate, or more specifically, for example, it immediately precipitates at less than 50° C. when used at 6 moles. Therefore, there is a risk in which precipitated crystals may cut the osmosis membrane when the temperature decreases near the membrane. This risk is particularly likely when the maintenance is carried out at room temperature. In order to reduce the risk of the crystal precipitation, it is unavoidable to drive the system at low concentration. As a result, it becomes difficult to obtain a sufficient osmotic pressure.

BRIEF DESCRIPTION OF THE DRAWINGS

FIG. 11 is a brief diagram showing an example of an osmotic pressure electric power generation system according to an embodiment;

FIG. 12 is a brief diagram showing an example of an osmotic pressure electric power generation system according to an embodiment;

FIG. 14 is a diagram showing a syringe test device;

FIG. 18 is a graph showing a result of a phase control test;

FIG. 19 is a graph showing a result of a phase control test;

FIG. 22 is a phase diagram for reference;

FIG. 23 is a graph showing a result of a phase control test; and

DETAILED DESCRIPTION

According to one embodiment, a working medium to be used in a circulatory osmotic pressure electric power generation system is provided. The working medium comprises water and inducing-liquid. The working medium, under conditions of a temperature of 5 to 35° C. and a pressure of 1 atmosphere, is in: (1) a state of 1 phase solution, a liquid-liquid mutually dissolved two-component mixed solution when a concentration of the water or the inducing-liquid in the total amount of the water and the inducing-liquid is 10% by weight or lower; and (2) a state of 2 phase solution, being separated into the water phase and the inducing-liquid phase when the concentration of the water or the inducing-liquid in the total amount of the water and the inducing-liquid is higher than 10% by weight. The circular osmotic pressure electric power generation system comprises a first chamber to accommodate the inducing-liquid of the working medium, a second chamber to accommodate the water and an osmosis membrane interposing between the first chamber and the second chamber, and generates electric power by driving a turbine by a flow of liquid which is contained the inducing-liquid and the water, and which is generated due to a difference in osmotic pressure in the osmotic pressure generator.

According to the embodiment, a circular osmotic pressure electric power generation system which can be driven at low cost can be provided.

Various Embodiments will be described hereinafter with reference to the accompanying drawings.

1. Working Medium for Circular Osmotic Pressure Electric Power Generation

The working medium for circular osmotic pressure electric power generation, according to one embodiment is a working medium to be used in a circular osmotic pressure electric power generation apparatus (referred to as a working medium hereinafter).

Figure 1:
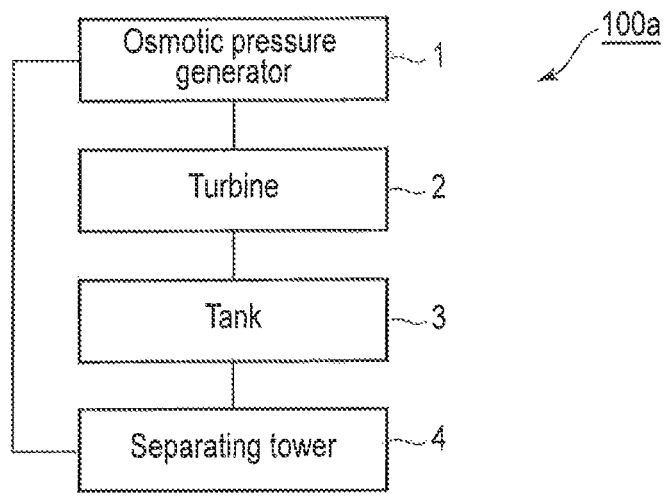
FIG. 1 is a block diagram showing an osmotic pressure electric power generation apparatus according to an embodiment.

First, an example of a circular osmotic pressure electric power generation system will now be described with reference to FIG. 1. FIG. 1 is a block diagram of a circular osmotic pressure electric power generation system. Circular osmotic pressure electric power generation apparatus 100a comprises an osmotic pressure generator 1, a turbine 2, a tank 3 and a separating tower 4. The osmotic pressure generator 1, the turbine 2, the tank 3 and the separating tower 4 are connected one another in this order to form a loop. The working medium circulates in the loop comprising the osmotic pressure generator 1, the turbine 2, the tank 3 and the separating tower 4. The working medium of this embodiment comprises water and inducing-liquid. The working medium has a transition from a first phase to a second phase or from a second phase to a first phase depending on the temperature and/or a ratio between water and inducing-liquid in the working medium. The first phase of the working medium is a state of a two-component mixed solution in which water and inducing-liquid are liquid-liquid mutually dissolved in each other. In other words, in the first phase, the working medium is a homogeneous single-phase liquid in which water and inducing-liquid are dissolved in each other. The second phase of the working medium is a phase separation state in which the water and inducing-liquid are separated into two phases. When this working medium is used in the circular osmotic pressure electric power generation system shown in FIG. 1, the working medium in a two-phase separation state is contained in the osmotic pressure generator 1 while the water and the inducing-liquid are separated by an osmosis membrane. In the osmotic pressure generator 1, a flow of liquid which is contained the inducing-liquid and the water, is produced due to the difference in osmotic pressure between the water and the inducing-liquid. The flow of the liquid is transferred to the turbine 2 to drive (or rotate) it for electric power generation. After driving the turbine 2, the liquid is transferred to the tank 3, and then to the separating tower 4. In the separating tower 4, the liquid is let stand, and thus subjected to phase separation back into a water phase and an inducing-liquid phase. In this manner, the working medium is recycled. The water phase and inducing-liquid phase obtained by the phase separation are transferred to the osmotic pressure generator 1, and the same operation as mentioned above is repeated to continuously generate electric power. Note that the tank 3 is provided to perform the separation quickly in the separating tower 4 in this circulation. That is, after driving the turbine 2, the liquid is transferred temporarily to the tank 3 so as not to disturb the phase separation process being conducted in the separating tower 4. In the separating tower 4, the liquid is let stand, and thus subjected to phase separation back into a water phase and an inducing-liquid phase.

Next, the working medium of the embodiment will be described. The working medium has a critical concentration. More specifically, the working medium is in a state of liquid-liquid mutually dissolved two-component mixed solution when the concentration of water or inducing-liquid in the total amount of the water and the inducing-liquid is 10% by weight or lower under the conditions that the temperature is 5 to 35° C. and the atmospheric pressure is 1 atmosphere, whereas it separates into a water phase and an inducing-liquid phase when the concentration is higher than 10% by weight. That is, the working medium should satisfy that under the condition of an atmospheric pressure of 1, when temperature from 5 to 35° C. and the concentration of water or inducing-liquid in the total amount of the water and the inducing-liquid is 10% by weight or lower, it be in a state of liquid-liquid mutually dissolved two-component mixed solution, whereas when the concentration is higher than 10% by weight, it separate into a water phase and an inducing-liquid phase. The meaning of the concentration of water or inducing-liquid in the total amount of the water and the inducing-liquid being 10% by weight or lower is that the concentration of either one of the components, which mainly constitutes the working medium, that is, the water or the inducing-liquid has a concentration of 10% by weight or lower. The term "concentration" used here represents a concentration in percent by weight (weight percent concentration). The weight percent concentration of a solution containing a solute in a solvent is represented by the following formula (1):

Weight percent concentration=solute/(solute+solvent)×100  Formula (1)

"Water or inducing-liquid having a concentration of 10% by weight or less" means, for example, that when water is the solute and the inducing-liquid is the solvent in the mixed solution (that is, the working medium) containing water and inducing-liquid, the concentration of the water should be 10% by weight. Similarly, for example, when the inducing-liquid is the solute and water is the solvent in the mixed solution (that is, the working medium) containing water and inducing-liquid, the concentration of the inducing-liquid should be 10% by weight. In other words, it suffices if the concentration is expressed by the weight of either one of water and inducing-liquid per 100 g of the working medium, and the unit is in "% by weight" or "wt. %".

Preferably, the working medium should be of the type which is in a state of liquid-liquid mutually dissolved two-component mixed solution under the conditions that the temperature is 25° C. and the atmospheric pressure is 1 atmosphere when the concentration of water or inducing-liquid in the total amount of the water and the inducing-liquid is 10% by weight or lower, and it separates into a water phase and an inducing-liquid phase when the concentration is higher than 10% by weight. More preferably, the working medium should be of the type which is in a state of liquid-liquid mutually dissolved two-component mixed solution under the conditions that the temperature is 25° C. and the atmospheric pressure is 1 atmosphere when the concentration of water or inducing-liquid in the total amount of the water and the inducing-liquid is 7% by weight or lower, and it separates into a water phase and an inducing-liquid phase when the concentration is higher than 7% by weight.

An example of the inducing-liquid contained in the working medium should only be a liquid compound with which a working medium has a critical concentration when the medium is prepared. The expression "having a critical concentration" means that the working medium exhibits different phases between a high-concentration zone and a low-concentration zone with respect to a specific concentration as a border. In other words, the critical concentration is a threshold concentration between high and low, at which the phase transition of the medium occurs from the first phase to the second phase or the second phase to the first phase. Here, it is preferable that the working medium of this embodiment have a critical concentration in a zone lower than the concentration zone of the conventional techniques.

An example of the inducing-liquid for the working medium having a preferable critical concentration is a liquid concentration having a low solubility to water. A liquid compound of a low solubility to water is a liquid which mutually dissolves with water when the amount is miniscule to slight, that is, for example, an organic solvent or a polymer compound. The organic solvent may be, for example, a halogen compound or chloroform. The halogen compound may be, for example, a fluorine compound, a chlorine compound, a bromine compound or an iodine compound. More specifically, for example, 2,2,3,3,3-pentafluoro-1-propanol (referred to as PF1P hereinafter) or chloroform is preferable inducing-liquids, PF1P being more preferable.

Figure 2:
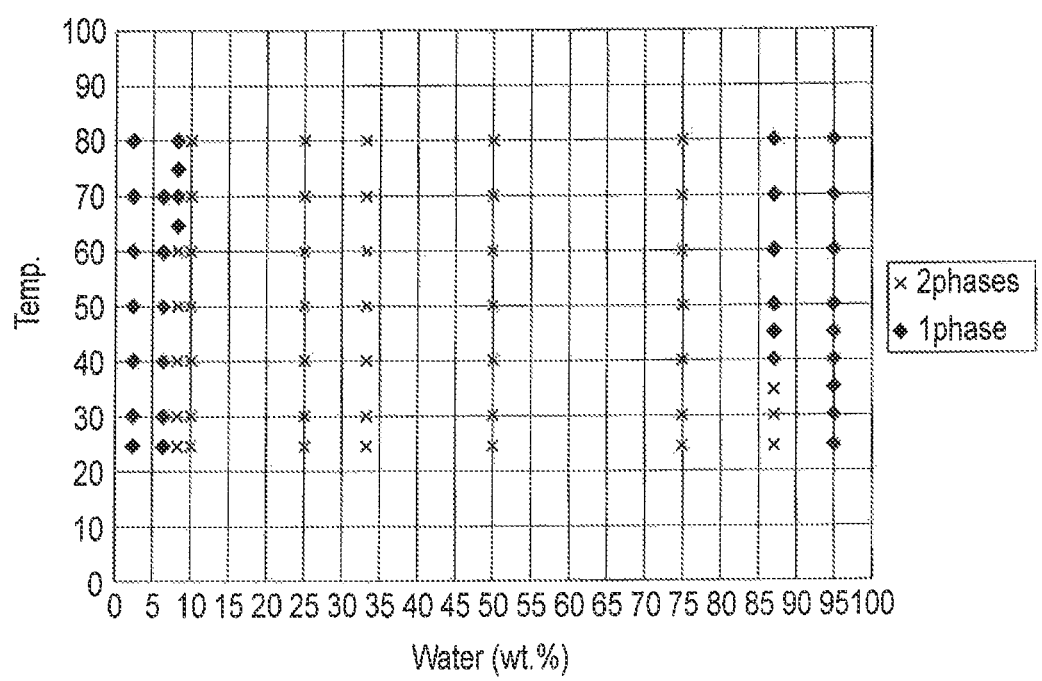
FIG. 2 is a phase diagram of an example of a working medium according to an embodiment.

For example, a mixed liquid of water and 2,2,3,3,3-pentafluoro-1-propanol (PF1P) undergoes phase transition as the concentration changes. The phase diagram thereof is shown in FIG. 2, with the vertical axis indicating the temperature and the lateral axis indicating the concentration in water as a percentage by weight (wt. % in the figure). The phase diagram is a graph showing the results of an observation in which PF1P and fresh water were put into a test tube at a predetermined mixture ratio and the test tube was heated in a water bath to heat the mixed solution, and the degrees of mixture at various temperatures were visually observed. The graph shows the results of the degree of mixture observed at various temperatures by cooling and then heating the mixture after once creating the state in which the liquids were completely dissolved in each other to be transparent at a certain temperature. Here, since PF1P has a boiling point of 81° C., the upper limit of the graph was setto 80° C. When the ratio of water was 80% by weight ("wt.%" in the figure), the mixture was not mixed together to be completely transparent if heated higher. For this reason, the range of temperature to be measured was set to 22 to 80° C.

Figure 3:
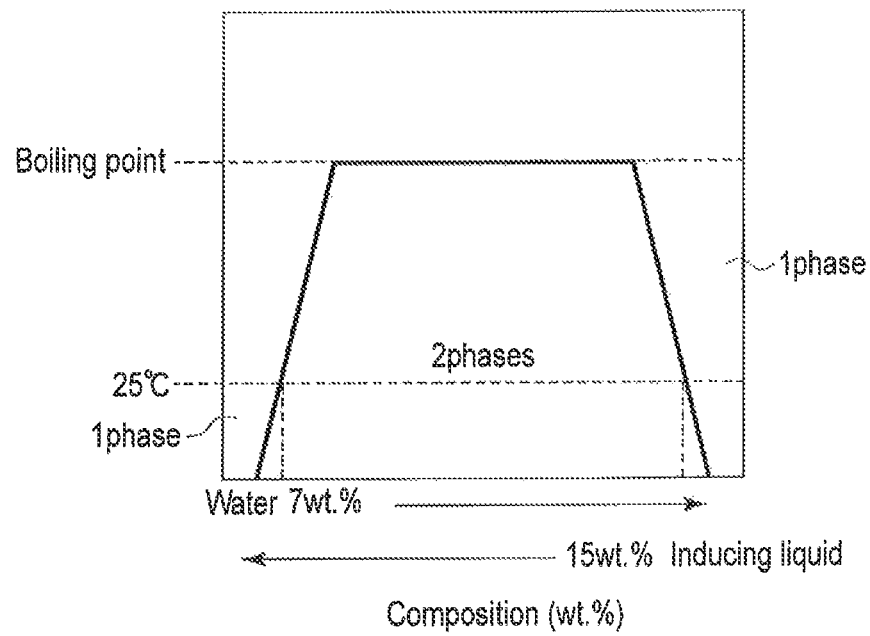
FIG. 3 is a phase diagram of an example of a working medium according to an embodiment.

From the data obtained in this test, a schematic phase diagram of the mixture liquid of PF1P and water is shown in FIG. 3. First, FIG. 3 will be described in terms of the relationship between the composition, that is, the ratio of components, and the phases at certain temperatures. At an atmospheric pressure of 1 and at 25° C., the mixture liquid of water and PF1P has a critical concentration when the mixture ratio between water and PF1P is about 7 to about 93 or about 93 to about 7. That is, when water or PF1P is contained in the working medium at 7% by weight or less, water and PF1P are completely mixed together to be transparent (indicated as "1 phase" in the figure), which is a state of a liquid-liquid mutually dissolved two-component mixed solution. On the other hand, when water or PF1P is contained in the working medium at a concentration of more than 7% by weight, water and PF1P are not completely mixed together, but is in a state of two-phase separation (indicated as "2 phase" in the figure). This is one example of the cases where, at a temperature of 5 to 35° C. and an atmospheric pressure of 1 atmosphere, the working medium is in a state of a liquid-liquid mutually dissolved two-component mixed solution when the concentration of either one of water and inducing-liquid in the working medium is 10% by weight or lower, whereas it is in a state of two-phase separation of water and an inducing-liquid when the concentration is more than 10% by weight.

Next, the effect of variation in temperature on phase when the composition is constant, will be described. For example, when the mixture ratio between water and PF1P is 7:93, the working medium is in a two-phase state when the temperature is lower than 25° C., whereas it is in a single-phase state at a temperature higher than 25° C. That is, in the case of the above-specified mixture ratio, the critical temperature is 25° C.

Figure 4:
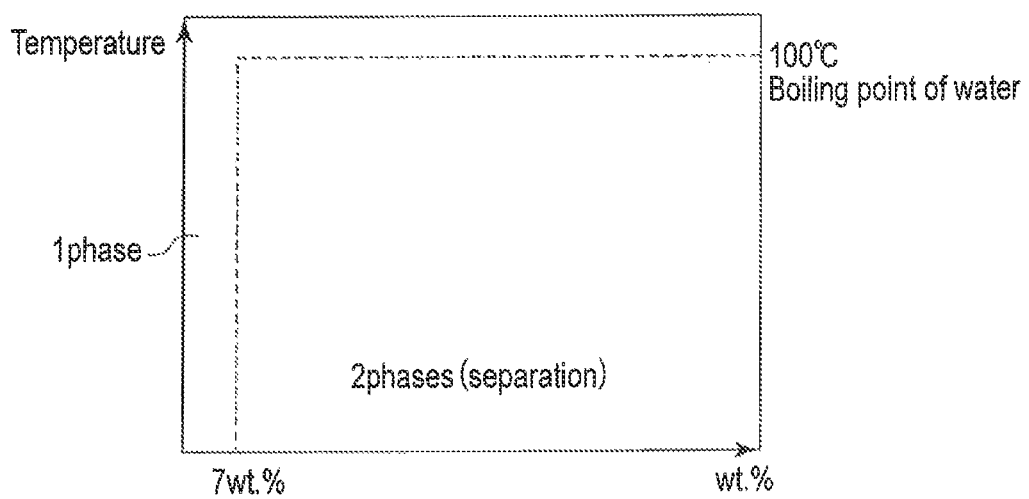
FIG. 4 is a phase diagram of an example of a working medium according to an embodiment.

It is preferable that the working medium of this embodiment be of a type which separates into two phases at a regular temperature (5 to 35° C.) or room temperature and which has a zone of a single-phase region smaller than that of a two-phase region. Here, the single-phase region is a region where the working medium can be present in a state of a liquid-liquid mutually dissolved single-phase two-component mixed solution in the phase diagram. On the other hand, the two-phase region is a region where the working medium is present in a state of being separated into two liquid phases in the phase diagram. A phase diagram of a more preferable working medium is shown in FIG. 4. The phase diagram of FIG. 4 shows a case where with respect to a critical concentration of 7% by weight, a single-phase region is maintained at any temperature when the concentration is lower than the critical concentration, whereas a two-phase region is maintained at any temperature when the concentration is higher than the critical concentration. The mixture systems of water and inducing-liquid, which have a phase diagram as shown in FIG. 4, have a very low solubility ratio, and therefore they start phase separation when the concentration of one of the components exceeds 7% by weight. For this reason, it is possible to have the separation carried out at high efficiency, thus enabling the separation at a temperature lower than the conventional cases. Thus, the recycling of the working medium production can be achieved by letting it stand still, and therefore the production cost and operation cost of the circulatory osmotic pressure electric power generation apparatus which uses this medium can be both suppressed at low.

Figure 5:
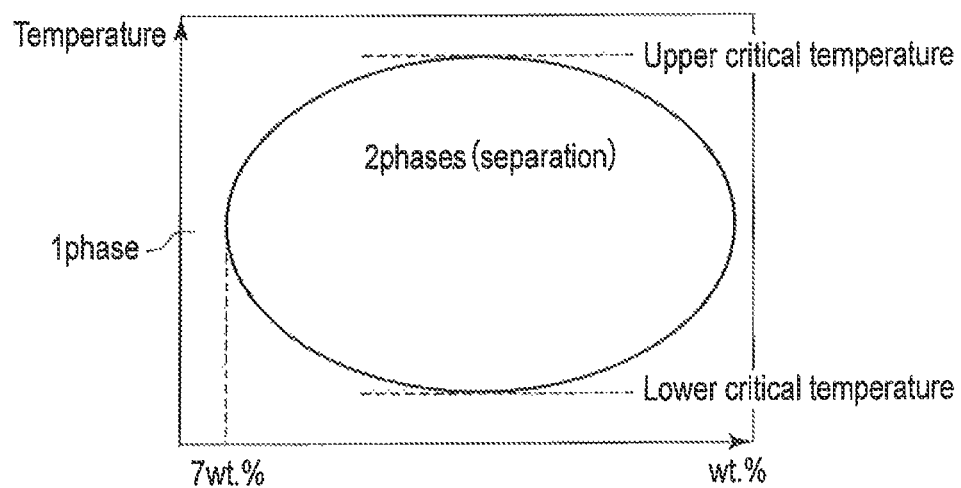
FIG. 5 is a phase diagram of an example of a working medium according to an embodiment.

In addition, another preferable example of the working medium is that having an upper critical temperature and a lower critical temperature. FIG. 5 is a phase diagram of an ideal example of a working medium having a lower critical temperature. As shown in FIG. 5, such a working medium has a borderline in concentration between a single-phase region, and a two-phase region, at which the concentration of one of components is near 7% by weight. Here, a mixture system of water and inducing-liquid, which has such a phase diagram shown in FIG. 5, has a very small ratio in area where the water and inducing-liquid dissolve with each other. That is, in the graph of FIG. 5, the area of the two-phase region (2 phases in the figure) is larger than that of the single-phase region (1 phase in the figure), and the phase separation starts when the concentration of one of the components exceeds 7%. Thus, the separation can be carried out efficiently, and also it can be carried out at a temperature lower than those of the conventional techniques. Therefore, the cost can be reduced even lower.

Further, the inducing-liquid of a working medium having a preferable critical concentration may be a mixture of compounds. For example, even a material having a mutual solubility to water or a high mutual solubility to water, can be altered in its phase diagram by adding a phase controlling agent thereto. In this manner, a low mutual solubility to water can be imparted. The inducing-liquid thus obtained is a liquid material having a low mutual solubility to water, and also a liquid which mutually dissolve with water if the amount thereof is very slight or low.

The phase controlling agent may be any compound which mutually dissolves with a compound to be employed as an inducing-liquid, or may be any material as long as it can impart a desired phase with respect to a specific compound. The phase of the working medium is controlled by adding an appropriate agent thereto. Examples of such a phase controlling agent include 2,2,3,3,3-pentafluoro-1-propanol (PF1P), 1-bromopropane (1BP) and ethanol. Examples of the inducing-liquid to which the agent to be added include an aqueous solution of 2-butoxyethanol (2BE) and tribromoethanol (TBE). When PF1P is added to an aqueous solution of 2-butoxyethanol (2BE), a mixture thereof with water exhibits a decreased lower critical temperature, thus controlled to have a lower critical temperature, and exhibits a narrowed single-phase region and an expanded two-phase region. In the meantime, when ethanol is added to tribromoethanol (TBE), a mixture thereof with water exhibits a limited tendency of precipitation of TBE, and a phase having an upper critical temperature which defines the single-phase region and the two-phase region. A mixture solution subjected to phase control by adding a phase controlling agent as described above can be used as a preferable inducing-liquid.

Figure 6:
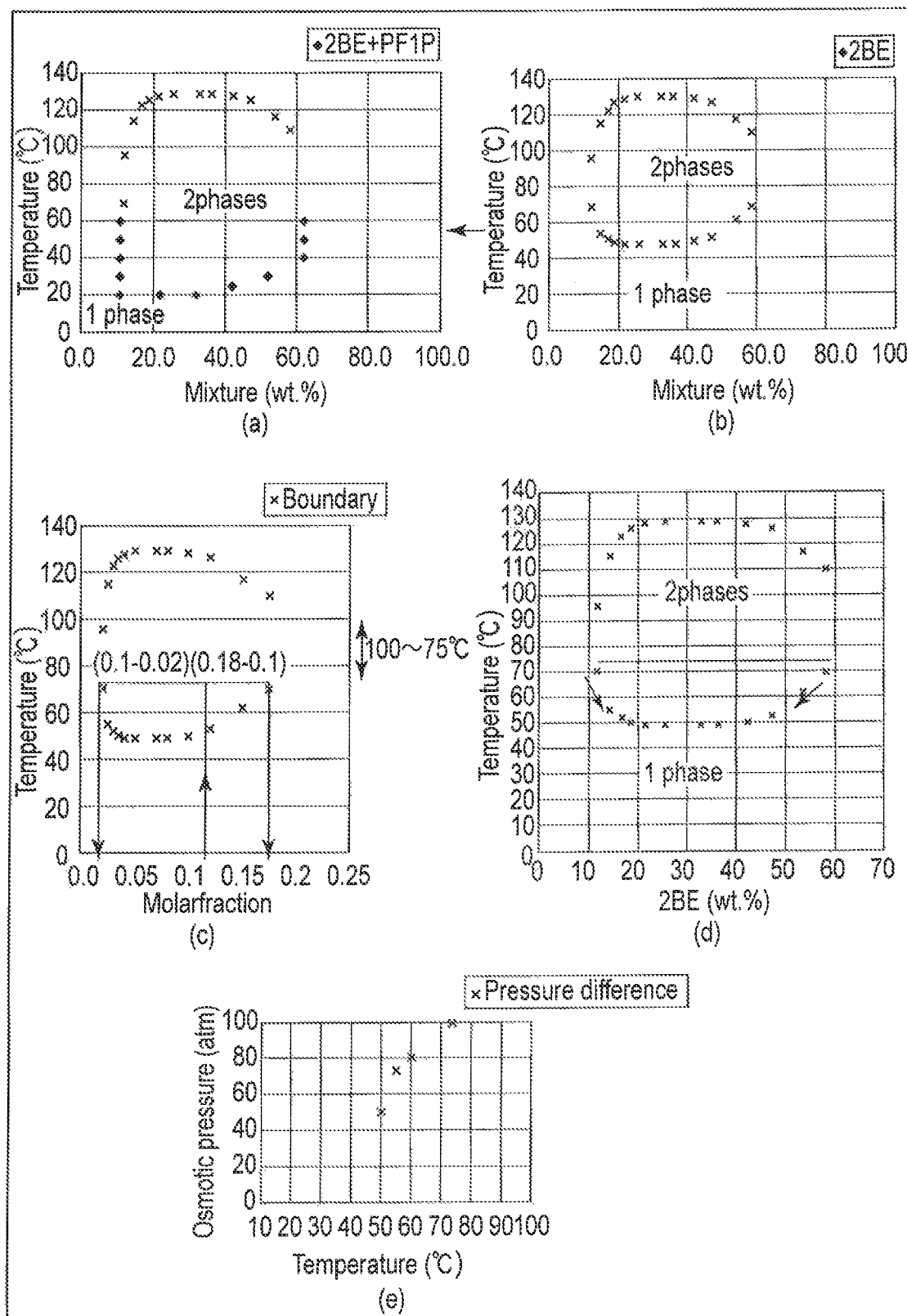
FIG. 6 is a phase diagram of an example of a working medium according to an embodiment.

An example will now be provided, in which PF1P was added to 2-butoxyethanol (2BE) at a concentration of 10% by weight. FIG. 6 (a) is a phase diagram of a working medium prepared by mixing water to the mixed material in which PF1P was mixed to 2BE at 10% by weight. FIG. 6 (b) is a phase diagram of a working medium prepared from a mixture of 2BE and water. As FIGS. 6 (a) and 6 (b) are compared with each other, it is understood that the lower critical temperature of the mixture of 2BE and PF1P is controlled downward, that is, changed to a lower temperature, and the two-phase region is expanded, narrowing the single-phase region.

2BE has excellent properties as a working medium for osmotic pressure electric power generation, as will now be explained. For example, in the case where 2BE is used as a working medium, raising the temperature of a mixture collected at a concentration of a molar fraction of 0.1 to 75° C. means, in FIG. 6 (c), to increase the temperature to the level of the line parallel to the X-axis (referred to as a "horizontal line" here). At this temperature, the concentration of one of the components of the working medium is expressed by the numeric value indicated by the arrow perpendicularly facing the X-axis (phase separation line) from the right end (which crosses with the critical point of the working medium) of the horizontal line indicated at the level of 75° C. in the graph. That is, a numerical value (molar fraction) at the point of intersection of the perpendicular line and the phase separation line. This numerical value represents the molar fraction of the higher concentration solution side. On the other hand, the concentration of the other one of the components of the working medium at this temperature is expressed by the numeric value indicated by the arrow perpendicularly facing the X-axis (phase separation line) from the left end (which crosses with the critical point of the working medium) of the horizontal line indicated at the level of 75° C. in the graph. That is, a numerical value (molar fraction) at the point of intersection of the perpendicular line and the phase separation line. As to the example shown in FIG. 6 (c), it can be understood that the molar fraction at the right-side intersection was 0.18, which can be interpreted when converted into a percentage by weight that a 2BE aqueous solution of 59% by weight was obtained. Here, when the reference is set to water, the molar fraction of the left-side intersection is the molar fraction of 2BE, which gives a 2BE-containing solution having a molar fraction of 0.02 (12% by weight). The liquid weight of each component solution after the separation can be read from the graph based on "principle of leverage". Let us suppose that the amounts of the separated liquids are defined as a(g) and b(g), respectively. Then, a(0.1−0.02)=b (0.18−0.1) is obtained, which gives a(0.08)−b(0.08), and therefore a=b. Here, it is understood that the separated liquids have the same weight by chance here. The concentrations of the liquids recovered at the borderline in phase in this phase diagram are 59% by weight and 12% by weight, respectively. Therefore, as is clear from TABLE 1, which indicates calculated osmotic pressures, the difference in osmotic pressure is high as 97 atm. Consequently, the output is expected to be 3.3 times as much as compared to the case of sea water.

TABLE 1

| Component A (MW) | Component B (MW) | Wt. % of B | Solute per 1 L (mol) | Osmotic pressure (atm) |
|---|---|---|---|---|
| Water (18) | 2-butoxyethanol (118.17) | 100 | 8.46 | 207 |
| Water (18) | 2-butoxyethanol (118.17) | 59 | 4.99 | 122 |
| Water (18) | 2-butoxyethanol (118.17) | 12 | 1.02 | 25 |
| Difference of osmotic pressure in osmotic pressure generator | | | 3.98 | 97 |
| Water (18) | NaCl | 3.5 | 0.59 | 29 |

Estimation of the different in osmotic pressure, obtained when the temperature of the heat source for the separation is 70° C. indicates that as the temperature decreases, the difference in concentration defined by both ends of a horizontal line drawn at a level of a specific temperature decreases gradually as shown in FIG. 6 (d). Here, the difference in concentration vanishes at 50° C. It can be understood that this temperature is substantially the limit for the two-phase separation. FIG. 6 (e) is a graph showing the difference in osmotic pressure calculated in consideration of the narrowing of the difference in concentration. As indicated in the graph, there is still a difference of 50 atmospheres even at 50° C. This value is more advantageous than the conventional osmotic pressure electric power generation which uses river water and sea water. However, usually, working mediums having such a phase diagram cannot be used at 50° C. for pressure electric power generation.

However, as discussed above, when, for example, PF1P is added to 2-butoxyethanol (2BE) at a concentration of 10% by weight, the phase separation can occur at room temperature. A working medium containing 2BE and water, which is manufactured using such a phase controlling agent, has a critical concentration, and can be employed as a preferable working medium in this embodiment. For example, when the concentration of 2BE in the water exceeds 10% by weight, the separation starts. Therefore, it is possible to carry out the separation with efficiency. Further, since the separation can occur at a lower temperature than conventional cases, the cost can be reduced even lower. Thus, 2-butoxyethanol having such a large difference in osmotic pressure can be used as a working medium exhibiting a more advantageous effect.

A phase controlling method which employs such a phase controlling agent may be provided as a further embodiment. It suffices if the phase controlling method involves that a compound which mutually dissolves with another compound to be used as an inducing-liquid is contained in the inducing-liquid. Thus, the number of types of compounds usable for the working medium comprising water and inducing-liquid can be increased, and so is the number of combinations of components in the working medium. In this manner, it becomes possible to provide a working medium with a desired effect according to a desired purpose, which enable to provide a circular osmotic pressure electric power generation system which can be driven at low cost.

Figure 7:
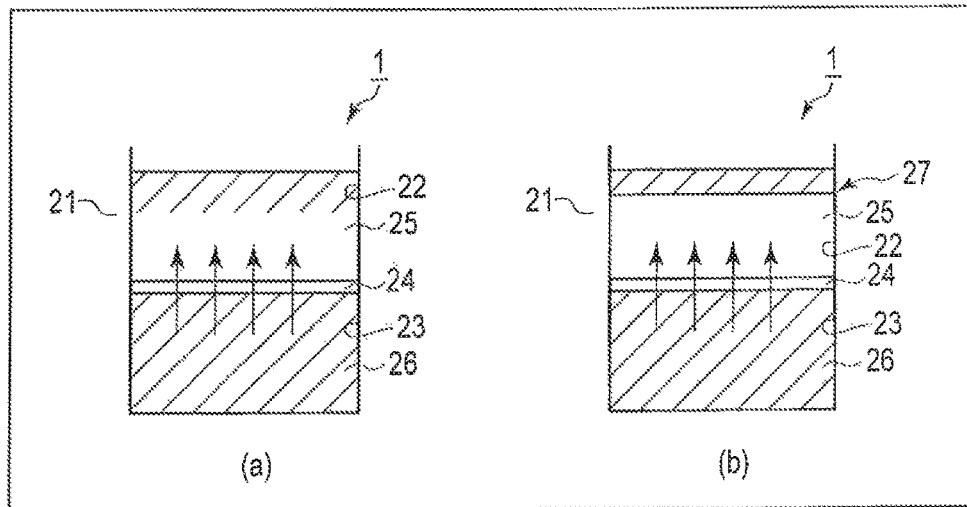
FIG. 7 is a schematic diagram showing an internal state of an example of an osmotic pressure generator.

As to any of the working media mentioned above, the specific gravity thereof should preferably be larger than that of water. For example, the specific gravity of the working medium should be 1.1 or higher, preferably 1.5 or higher. By using a working medium having such a specific gravity, the permeability of water to the osmosis membrane can be improved. A further detailed explanation will now be provided with reference to FIG. 7. FIGS. 7 (a) and 7 (b) are a schematic diagram of the osmotic pressure generator 1, respectively. A container 21 comprises a first chamber 22, a second chamber 23 and an osmosis membrane 24 configured to partition the inside into these chambers 22 and 23. The first chamber 22 is located above the second chamber 23. An inducing-liquid 25 is contained in the first chamber 22, and water 26 is contained in the second chamber 23. In this structure, it is preferable that the inducing-liquid 24 has a specific gravity of 1.1 or higher, or more preferably, 1.5 or higher, and also has a low mutual solubility to water. The water 26 contained in the second chamber 23 permeates the osmosis membrane 24 and moves to the first chamber 22. Up to a certain point of time from the start of the movement of the water 26, the moved portion of the water 26 is considered to gather in the vicinity of the upper layer without creating a phase boundary as shown in FIG. 7 (a). Then, when the container is let stand for a while, a phase boundary 27 is created and the liquid is separated into two phases as shown in FIG. 7 (b).

It should be noted that a new discovery has been made here that when a liquid having a low mutual solubility to water and water are brought into contact with each other via an osmosis membrane interposed therebetween, the water is suctioned into the liquid having a low mutual solubility to water. The liquid having a low mutual solubility to water is a liquid which is mutually dissolved in only a minute or a small amount of water. With this structure, the movement of water from the second chamber 23 to the first chamber 22 is excellently retained, thereby making it possible to perform osmotic pressure electric power generation at high efficiency. As will be demonstrated later, with an embodiment having the above-described structure; the water can be moved at drastically higher efficiency and thus a large difference in osmotic pressure can be maintained.

The working medium of this embodiment requires heating up to only a lower temperature is needed for recycling. Thus, a circular osmotic pressure electric power generation apparatus can be driven at a lower temperature such as room temperature or ordinary temperature, which makes it possible to drive the apparatus at low cost. Further, water can penetrate the osmosis membrane for movement with efficiency. That is, the structure of the separating tower for recycling can be further simplified. With such a working medium, it is possible to provide a circular osmotic pressure electric power generation apparatus which can be driven at low cost.

2. Circular Osmotic Pressure Electricity Generation Method

The circular osmotic pressure electricity generation method is an electric power generation method which generates an electric power by circulating a working medium. Examples of the working medium usable in this method are those aforementioned. This method comprises: passing a portion of the water through the osmosis membrane due to a difference in osmotic pressure between the water and the inducing-liquid placed while interposing an osmosis membrane therebetween to create a flow of liquid which is contained the inducing-liquid and the water; driving a turbine by the flow thus created, for electric power generation; phase-separating the liquid in phase into a water phase and an inducing-liquid phase after driving the turbine; and transferring the water phase and the inducing-liquid phase obtained by phase separation towards the osmosis membrane side such as to place while interposing the osmosis membrane therebetween. Further, when the water phase and the inducing-liquid phase are returned towards the osmosis membrane such as to place while interposing the osmosis membrane therebetween, the turbine is further rotated due to the osmotic pressure difference between the water phase and the inducing-liquid phase.

As described, according to this method, the electric power generation is repeated or continuously carried out while recycling the working medium. With this method and using the above-described working medium, it is possible to provide a circular osmotic pressure electric power generation system which can be driven at low cost.

It should noted that the status in which water and an inducing-liquid are placed by interposing a osmosis membrane therebetween, can be observed when setting the water and the inducing-liquid are placed by interposing the osmosis membrane therebetween as an initial state at the start of the circular osmotic pressure electric power generation method in a circular osmotic pressure electric power generation system. For example, in this case, water and an inducing-liquid should only be placed by interposing the osmosis membrane therebetween as an initial state at the start of the circular osmotic pressure electric power generation method. In this case, it suffices if the flow of liquid due to the osmotic pressure difference is created from the initial state, and the turbine is driven by the flow. As an alternative version, it is also possible to employ a two-component mixed solution in which components are liquid-liquid mutually dissolved in each other at the start of the circular osmotic pressure electric power generation method as an initial state. In this case, it suffices if the phase separation process is carried out to follow the initial state.

According to a further version, a water phase and an inducing-liquid phase may be placed while interposing the osmosis membrane therebetween at the start of the circular osmotic pressure electric power generation method as an initial state. In this case, if suffices if the flow of liquid is created due to the osmotic pressure difference to follow the initial state, and the turbine is driven by the flow.

3. Circular Osmotic Pressure Electric Power Generation System

Figure 8:
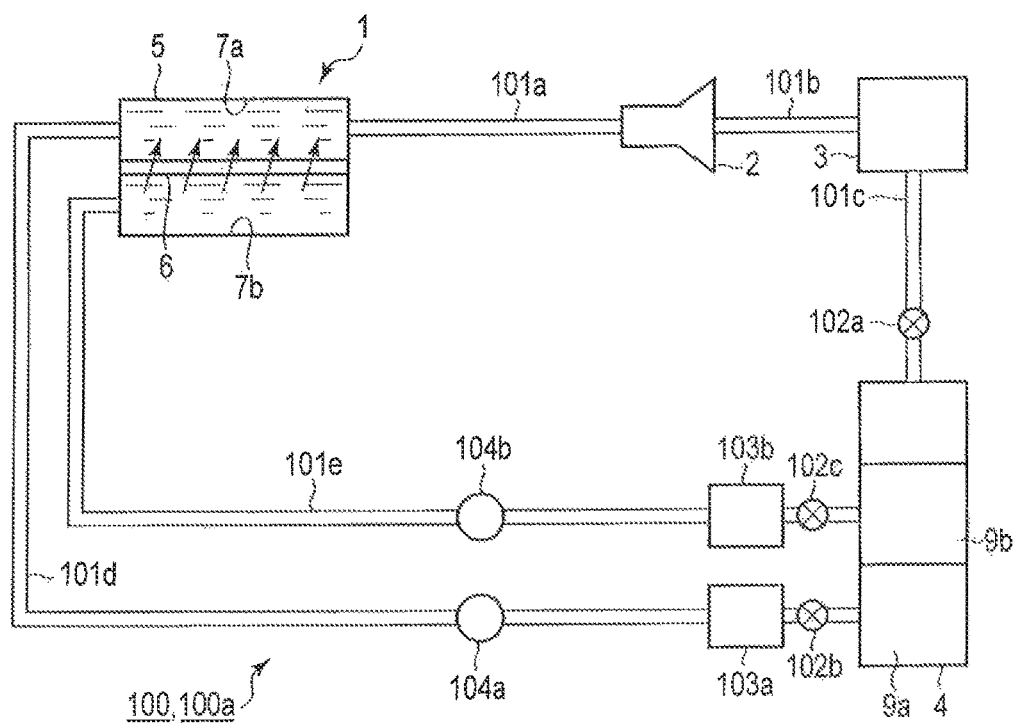
FIG. 8 is a brief diagram showing an example of an osmotic pressure electric power generation system according to an embodiment.

An example of the circular osmotic pressure electric power generation system according to an embodiment will now be described with reference to FIGS. 8 to 11. FIG. 8 is a schematic diagram showing the circular osmotic pressure electric power generation system.

A circular osmotic pressure electric power generation system 100 comprises an osmotic pressure electric power generation apparatus 100a and a working medium which circulates in the osmotic pressure electric power generation apparatus 100a. The osmotic pressure electric power generation apparatus 100a comprises: an osmotic pressure generator 1; a turbine 2; a buffer tank 3; a separating tower 4; pipeline 101a connecting the osmotic pressure generator 1 and the turbine 2 to each other; pipeline 101b connecting the turbine 2 and the buffer tank 3 to each other; pipeline 101c connecting the turbine 2 and the buffer tank 3 to each other; on-off valve 102a interposed in pipeline 101c; pipelines 101d and 101e connecting the separating tower 4 and, respectively, first chamber 7a and second chamber 7b of the osmotic pressure generator 1; a set of on-off valve 102b, tank 103a and pump 104a interposed the pipeline 101d in this order with reference to the separating tower 4; and a set of on-off valve 102c, tank 103b and pump 104b interposed the pipelines 101e in this order with reference to the separating tower 4. In the separating tower, to keep the separating temperature of the working solution, there should be radiator (not illustrated) of excess heat from other source such as factory or thermal power generator.

Figure 9:
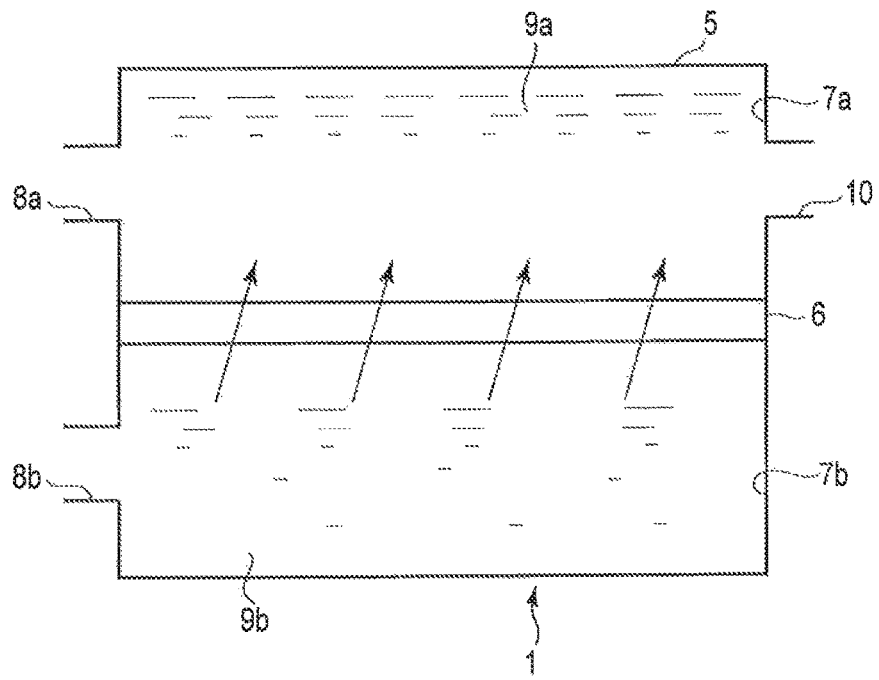
FIG. 9 is a cross sectional view showing an example of an osmotic pressure generator according to an embodiment.

Here, an internal structure of the osmotic pressure generator 1 will now be described with reference to the cross-sectional view of FIG. 9. The osmotic pressure generator 1 comprises a processing container 5 and a osmosis membrane 6. The osmosis membrane 6 is placed in the processing container 5 while the periphery of the membrane being fixed onto inner wall surfaces of the processing container 5. Thus, the membrane 6 divides the inside of the processing container 5 into first chamber 7a and second chamber 7b. In the processing container 5, first chamber 7a is located above second chamber 7b. A section of the processing container 5, where first chamber 7a is situated, has an opening, first inlet 8a. Through first inlet 8a, an inducing-liquid 9a, separated in the separating tower 4, is allowed to flow in. A section of the processing container 5, where second chamber 7b is situated, has an opening, second inlet 8b. Through second inlet 8b, water 9b, separated in the separating tower 4, is allowed to flow in. A section of the processing container 5, where first chamber 7a is situated, has an opening, an outlet 10 at a position opposing first inlet 8a. The direction of flow of water which permeates the osmosis membrane 6 is, as indicated by arrows in the figure, upward from a lower side to an upper side, that is, the direction from the second chamber 7b to the first chamber 7a. The outlet 10 is communicated with the pipe 101a. From the outlet 10, liquid which includes a portion of the water permeating the osmosis membrane 6 and moving from second chamber 7b to first chamber 7a, and a portion of the inducing-liquid contained in first chamber 7a, is allowed to flow. As the portion of the water permeates the osmosis membrane 6 and moves from the second chamber 7b to the first chamber 7a, a hydraulic pressure in the first chamber 7a increases to create a flux when the liquid flows out from the outlet 10. This flux rotates the turbine 2 to generate electric power.

The osmosis membrane 6 usable for the osmotic pressure generator 1 may be any commercially available ones as long as it is not damaged by a liquid employed as the working medium, for example, an organic solvent. Specific usable examples of the osmosis membrane 6 include a cellulose acetate membrane and a polyamide film. Further, the osmosis membrane 6 may be a forward osmosis membrane or a reverse osmosis membrane, though the forward osmosis membrane is preferable. The process container 5 should only be formed of a material suitable to accommodate the working medium. The process container 5 may be of a sealed type, that is, a sealed process container.

The liquid, which is contained the inducing-liquid and the water, flowing out of the outlet 10 is transferred through pipeline 101a to the turbine 2 (see FIG. 8). The flux created by the liquid transferred rotates the turbine 2, thereby generating electric power.

After generating electric power by rotating the turbine 2, the liquid is transferred to the buffer tank 3 via pipeline 101b. The buffer tank 3 temporarily accommodates the liquid. The buffer tank 3 is connected to the separating tower 4 via pipeline 101c. The on-off valve 102a is interposed in pipeline 101c. The on-off valve 102a is closed while the phase separation of the working medium is in progress in the separating tower 4 and also the liquid are being transferred. The on-off valve 102a is opened to allow the liquid to flow into the separating tower 4.

The separating tower 4 comprises an inlet through which the liquid flowing out of the buffer tank 3 is allowed to come in, and two outlets through which liquids separated into two phases are allowed to flow out, respectively. While the liquid is subjected to phase separation in the separating tower 4, the on-off valve 102a is closed to inhibit the liquid from flowing into the separating tower 4. In this way, the phase separation is promoted.

After the separation of the liquid is finished in the separating tower 4, the liquids of two phases (a water phase and a inducing-liquid phase) obtained by the phase separation are allowed to flow out from the separating tower 4 to be transferred to pipeline 101d and pipeline 101e, respectively. Subsequently, the on-off valve 102a is opened to allow the liquid accommodated in the buffer tank 3 to flow once again into the separating tower 4. When a sufficient amount of the liquid flows into the separating tower 4, the on-off valve 102a is closed. In the separating tower 4, the above-described separating operation is repeated for electric power generation in a circularly manner.

The two liquids flowing out from the separating tower 4 are transferred by pumps 104a and 104b, respectively, and returned to first chamber 7a and second chamber 7b of the process container 5 via pipelines 101d and 101e, respectively. The liquid in the separating tower 4 is separated into respectively phases after the water moving to the upper layer and the inducing-liquid moving to the lower layer. The inducing-liquid is transferred to tank 103a and temporarily accommodated therein when the on-off valve 102a is opened. The water is transferred to tank 103a and temporarily accommodated therein when the on-off valve 102c is opened. At this point, the working medium is already recycled in the state to be reused. After that, the inducing-liquid contained in tank 103a is transferred by pump 104a through pipeline 101d to first chamber 7a of the osmotic pressure generator 1. The water-phase liquid is transferred by pump 104b from tank 103b through pipeline 101e to second chamber 7b of the osmotic pressure generator 1.

Thus, as the working medium circulates in the osmotic pressure electric power generation apparatus 100a, the circular osmotic pressure electric power generation system continuously generates electric power.

Figure 10:
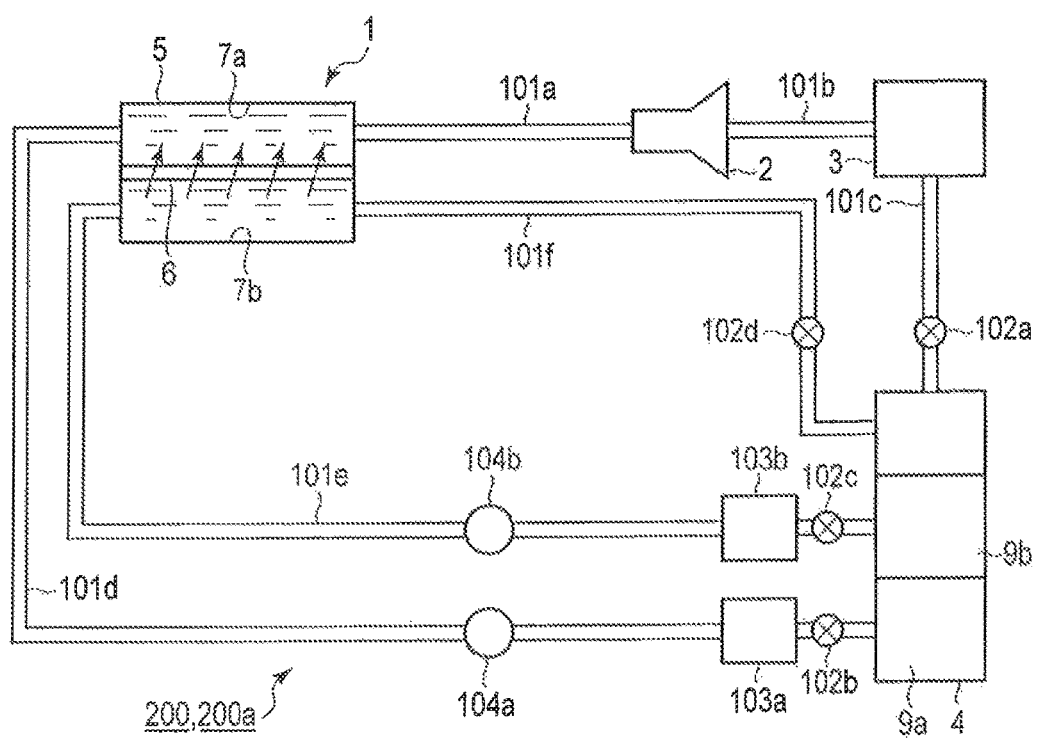
FIG. 10 is a brief diagram showing an example of an osmotic pressure electric power generation system according to an embodiment.

The circular osmotic pressure electric power generation system may further comprise a pipeline which connects second chamber 7b and the separating tower 4 to each other. An example of such an embodiment is shown in FIG. 10. A circular osmotic pressure electric power generation system 200 shown in FIG. 10 further comprises pipeline 101f connecting the second chamber 7b and the separating tower 4 with each other and an on-off valve 102d in addition to those of the circular osmotic pressure electric power generation system 100. Besides those specified above, the system may comprise similar structural elements to those of the circular osmotic pressure electric power generation system 100.

In the circular osmotic pressure electric power generation system 200, the circular osmotic pressure electric power generation system 100, a section of the processing container 5, where second chamber 7b of the osmotic pressure generator 1 is situated, has another opening, an outlet, and the separating tower 4 has a further inlet. The outlet of second chamber 7b and the further inlet of the separating tower 4 are communicated to each other via pipeline 101f. With this structure, a liquid portion which did not move from the second chamber 7b to the first chamber 7a is discharged from the outlet of the second chamber 7b. In this manner, it is possible to prevent the solute portion (that is, inducing-liquid) which did not permeate the osmosis membrane 6 but remains in the water, from accumulating in second chamber 7b, which increases the concentration of the inducing-liquid in the solution then contained in second chamber 7b. Thus, with the outlet provided in the section of the process container 1, where second chamber 7b is situated, to discharge the liquid, it is possible to prevent the decrease in the osmotic-pressure difference between the water on the second chamber 7b side and the inducing-liquid on the first chamber 7a side. Or the accumulation of the inducing-liquid in second chamber 7b can be prevented. Further, it is possible to prevent damage to the osmosis membrane 6 which may be caused by precipitates from the inducing-liquid portion which can no longer dissolve with the water phase in second chamber 7b.

Further, it is preferable that the on-off valve 102d be interposed in pipeline 101f, to allow the liquid flowing out from the outlet of second chamber 7b to pass pipe 101f while the on-off valve 102d is open, and to flow into the separating tower 4.

Further, although it is not shown in the figure, the circular osmotic pressure electric power generation system 200 should preferably comprise a further on-off valve and a tank interposed in pipeline 101f in this order from the second chamber 7b side. With this structure, the liquid from second chamber 7b can be temporarily stored according to the operation status of the separating tower 4.

Further, the circular osmotic pressure electric power generation system 100 shown in FIG. 8 and the circular osmotic pressure electric power generation system 200 shown in FIG. 10 each may further comprise a pressure exchanger or a pump.

FIG. 11 shows an example of the circular osmotic pressure electric power generation system 300 further comprising a pressure exchanger. A pressure exchanger 105 is installed across pipeline 101a and pipeline 101d so as to exchange the pressure therebetween. The flux of the fluid which rotates the turbine 2 depends not only on the osmotic pressure difference between the liquid in first chamber 7a and the liquid in second chamber 7b, but also the difference in hydraulic pressure between the inducing-liquid flowing into first chamber 7a from pipeline 101d through first inlet 8a, and the water flowing into second chamber 7b from pipeline 101e through second inlet 8b. Therefore, by adjusting the hydraulic pressure in pipeline 101d using a pressure exchanger with respect to that of pipeline 101a, the difference in hydraulic pressure can be adjusted between the inducing-liquid and the water when reflowing into the osmotic pressure generator 1 after recycled in the separating tower 4. In this manner, the electric energy obtained by power generation can be maximized. The pressure exchanger configured to adjust the difference in hydraulic pressure between the inducing-liquid flowing into first chamber 7a and the water flowing into second chamber 7b may be installed between any pipelines in order to obtain a desired difference in hydraulic pressure.

Further, the circular osmotic pressure electric power generation systems 100, 200 and 300 each may further comprise a pump 106. FIG. 12 shows an example of the circular osmotic pressure electric power generation system 400 further comprising a pump 106. The pump 106 is interposed pipeline 101a which is located between the osmotic pressure generator 1 and the turbine 2. With the osmotic pressure electric power generation apparatus 400a comprising the pump 106, the circulation of the working medium can be more easily carried out. Thus, the electric power generation by the turbine 2 can be carried out more reliably. The pump 106 is configured to move the liquid from the osmotic pressure generator 1 to a level higher than the location where the osmotic pressure generator 1 and the turbine 2 are situated, and after that, the liquid is dropped towards the turbine 2 from the high level at a predetermined flow. Thus, the turbine 2 is rotated by the flux of the dropping water.

Further, the circular osmotic pressure electric power generation systems 100, 200 and 300 each may use an osmotic pressure element as the osmotic pressure generator 1. The osmotic pressure element is an osmotic pressure generator 1 having a volume of about 1 to about 20 L. When applied to practical use, a plurality of such osmotic pressure elements may be aggregated into an osmotic pressure module, which is used to integrate the pressures of these osmotic pressures into one pressure to be outputted. In the osmotic pressure module, if one of the elements contained in the osmotic pressure module is degraded by wearing, it is possible to replace only the degraded one. Therefore, this embodiment achieves an excellent maintenance property and a high cost performance.

Figure 13:
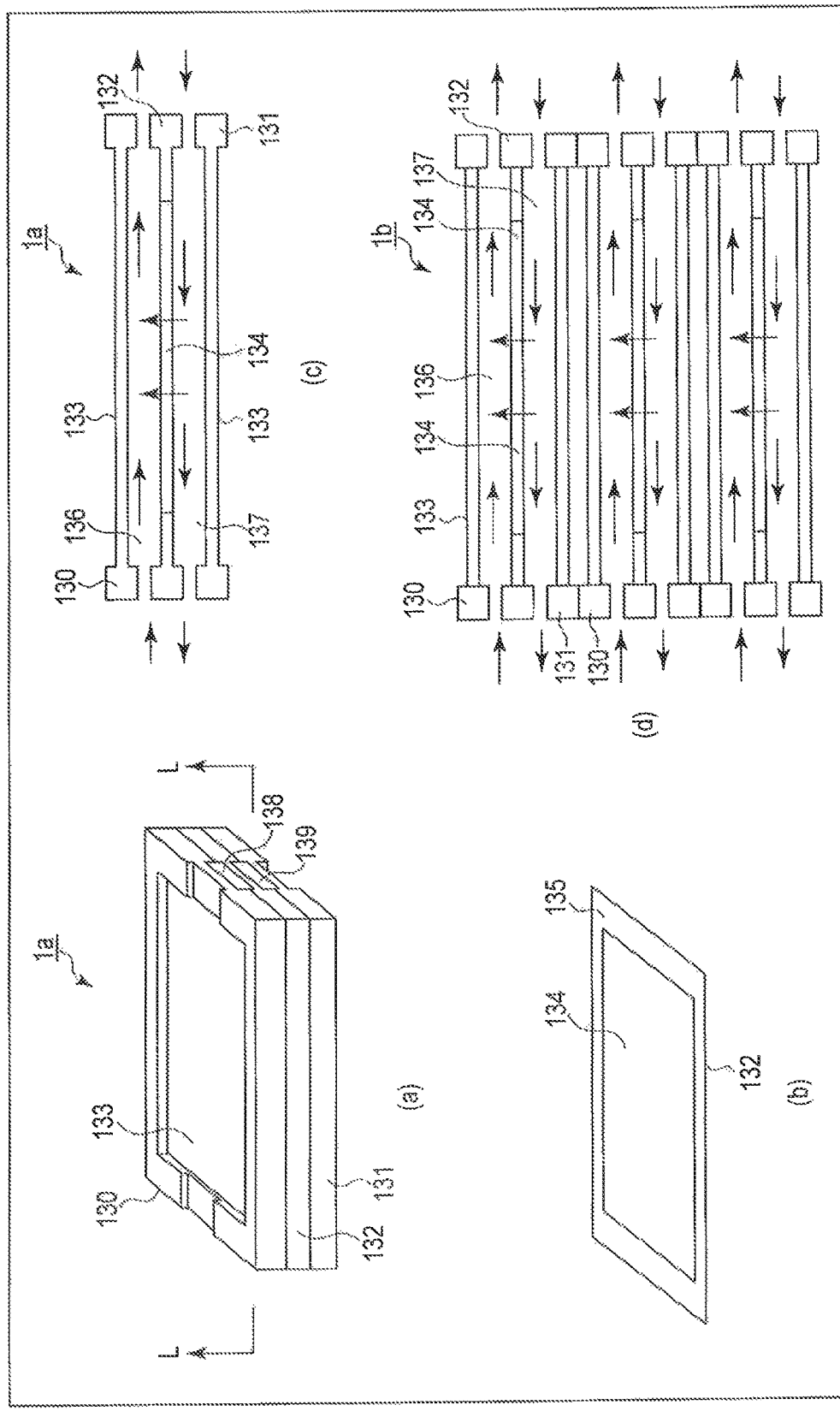
FIG. 13 is a diagram showing an example of an osmotic pressure generator according to an embodiment.

An example of the osmotic pressure generator 1 provided as an osmotic pressure element will now be described with reference to FIG. 13. FIG. 13(a) is a schematic view of unit 1*a*; FIG. 13(*b*) is a schematic view of a osmosis membrane member; FIG. 13(*c*) is a cross section of unit 1*a* taken along the line L-L shown in FIG. 13A; and FIG. 13(*d*) is a cross section of osmotic pressure element 1*b* constructed by stacking a plurality of units 1*a*.

An osmotic pressure element comprises at least one unit 1*a* as a minimum unit. The osmotic pressure element as the osmotic pressure generator 1 may comprise one unit 1*a*, or a plurality of units 1*a*.

One unit 1*a* comprises a first substrate 130 and a second substrate 131, each having a recess portion configured as a flow path on both surfaces thereof, and a osmosis membrane member 132. A method of manufacturing a unit 1*a* is as simple as stacking a osmosis membrane member 132 and a first substrate 130 on a second substrate 131 in this order, and bonding them to each other (FIG. 13(*a*)). The osmosis membrane member 132 comprises a osmosis membrane 134 and a frame 135 supporting the membrane (FIG. 13(*b*)). The unit 1*a* comprises inside a first chamber 136 defined by the recess portion in one surface of the first substrate 130 and one surface of the osmosis membrane member 132, and a second chamber 137 defined by the recess portion in one surface of the second substrate 131 and the other surface of the osmosis membrane member 132. The first chamber 136 is situated above the second chamber 137. The unit 1*a* comprises openings in one end surface which normally intersects with the longitudinal direction thereof, that is, a through hole 138 at a location corresponding to the first chamber 136 so as to allow the liquid from the first chamber 136 to flow out and a through hole 139 at a location corresponding to the second chamber 137 so as to allow the water-phase liquid to flow into the second chamber 137. In the other end surface which normally intersects the longitudinal direction thereof, the unit 1*a* comprises openings, that is, a through hole (not shown in FIG. 13A) at a location corresponding to the first chamber 136 so as to allow the inducing-liquid to flow into the first chamber 136 and a through hole (not shown in FIG. 13(*a*)) at a location corresponding to the second chamber 137 so as to allow the liquid to flow out from the second chamber 137. The first chamber 136 and the second chamber 137 are separated by the osmosis membrane 134. With this structure, as the inducing-liquid flowing in from the through hole of one end surface and the water flowing in from the through hole 139 in the opposing end surface are brought into contact with each other via the osmosis membrane 134, the difference in osmotic pressure is created therebetween, which makes a portion of the water in the second chamber 137 to pass through the osmosis membrane 134 and move to the first chamber 136. Due to the movement, a flux is created. This flux is allowed to flow out from the through hole 138 situated to oppose the through hole in which the inducing-liquid flows. The stream of the flowing-out liquid is transferred to the turbine 2.

The osmotic pressure element may comprise a plurality of units 1*a*. FIG. 13(*d*) shows a cross section of an example of an osmotic pressure element comprising a plurality of units 1*a*. An osmotic pressure element 1*b* comprises a plurality of units 1*a* stacking one on another into layers. Each of the plurality of units 1*a* of the osmotic pressure element 1*b* is disposed such that the first chamber 136 is situated above the second chamber 137. The units 1*a* of the osmotic pressure element 1*b* may be jointed together, or integrated into one body as accommodated inside the housing. Alternatively, the element may be structured such that the fluxes created from all the units 1*a* contained in the osmotic pressure element 1*b* are gathered together as one to be transferred to the turbine 2.

The osmotic pressure generator 1 may be used while being fixed to a supporter such as a base, shelf, stand or tower. When the osmotic pressure generator 1 is fixed to such a supporter, the pressure created can be efficiency utilized. For the fixation, the osmotic pressure generator 1 may comprise a projection on its outer side. For the fixation of the osmotic pressure generator 1 to the supporter, for example a spring structure may be provided on the supporter to hold the projection (not shown).

The osmotic pressure generator 1 having the above-described structure has a large ratio in the area of the osmosis membrane with respect to the capacity of the first chamber 136 and the second chamber 137. Therefore, the contact surface between the inducing-liquid and the water relatively increases, and thus the hydraulic pressure to be output to the turbine 2 can be efficiently produced, thereby increasing the hydraulic pressure.

In this embodiment, such a working medium is employed, that can be separated into two liquid phases by letting the mixed solution after use stand still at a room temperature or a temperature lower than conventional techniques, for recycle. Thus, the separating operation and the redirection of the liquid after separation are easy to perform, and the driving cost can be maintained at low. Further, gas related to the working medium is not produced, and therefore the structure of the separating tower 4 can be simplified. Further, such a component which may damage the osmotic pressure electric power generation apparatus 100*a*, as gaseous ammonia is not produced, and therefore the maintenance cost of the apparatus can be kept low. Further, the construction cost and the driving cost for the facilities can also be kept low. As described above, according to this embodiment, it is possible to provide a circular osmotic pressure electric power generation system which can be driven at low cost.

Unlike the osmotic pressure electric power generation by river water and sea water, the embodiments are carried out with liquids isolated from the external environment, and therefore the membrane is free from the biological contamination. Therefore, the life of the membrane can be prolonged, and thus the cost can be reduced.

Further, such an intermediate maintenance as backwashing can be greatly cut down, and therefore the driving time can be prolonged, and the operating rate can be increased. Since the working medium does not involve gaseous ammonia, designing the system is easy and at the same time, a multi-stage distillation system is not required. Furthermore, each of the liquid phases subjected to the liquid-liquid phase separation can be directly collected by the respective pipe. Further, for the working medium, an optimal material can be selected out of those having similar properties, and therefore the degree of freedom in system designing can be widened. Ammonium is corrosive and highly poisonous, but with the phase control discussed above, it is possible to increase the range of selectable safe materials. Moreover, with the use of an inducing-liquid having a high specific gravity, the polarization of concentration near the membrane can be suppressed, which makes it possible to perform osmotic pressure electric power generation with high efficiency.

EXAMPLES (1) Syringe Test Device

A manufacturing process of a syringe test device will now be described with reference to FIG. 14(*a*).

First, two 1 mL-disposable plastic syringes 211 and 212 having flanges 211a and 212a on the one end, respectively, were prepared. In each of the resin syringes 211 and 212, a distal end to which an injection needle is to be set was cut out (S1). The grip portions of the two cut syringes 211 and 212 were set to face each other, and two rubber pieces and one osmosis membrane were interposed therebetween without having air entering. More specifically, they were interposed in the order of the flange 211a of the first syringe 211, the first rubber piece 213, the osmosis membrane 214, the second rubber piece 215 and the flange 212a of the second syringe 212, and they are fixed together with a clip (not shown)(S2).

As described above, a syringe test device 216 was obtained (S3). As the osmosis membrane 214, ES 20, which is an RO membrane manufactured by Nitto Denko Corporation, was used. As the first and second rubber pieces 213 and 215, rubber disks were used, with a circular hole having a diameter of 5 mm opened therein as shown in FIG. 14(b).

(2) Syringe Test 1

Example 1

According to the procedure described in (1) above, a syringe test device 216 in which 2,2,3,3,3-pentafluoro-1-propanol (PF1P) was contained in the first syringe 211 and fresh water was contained the second syringe 212 was prepared. The injection of the liquids into the syringes 211 and 212 used for the test was carried out between steps (S1) and (S2). Then, the syringe test device was placed such that the first syringe 211 was situated above the second syringe 212, and fixed vertically with respect to the installation surface, and let stand under conditions of 25° C. and 1 atmosphere (that is, the syringe vertically stands). After that, the movement of water was measured by reading calibration markings every hour. Here, the liquid contained in the syringe test device 216 did not leak outside during the manufacturing process of the syringe test device 216 or during the test.

For comparison, another syringe test device 216 was prepared in a similar manner to the test using PF1P described above except that 3.5 wt % of sea water was contained in the first syringe 211, and a similar test was carried out.

Results

Figure 15:
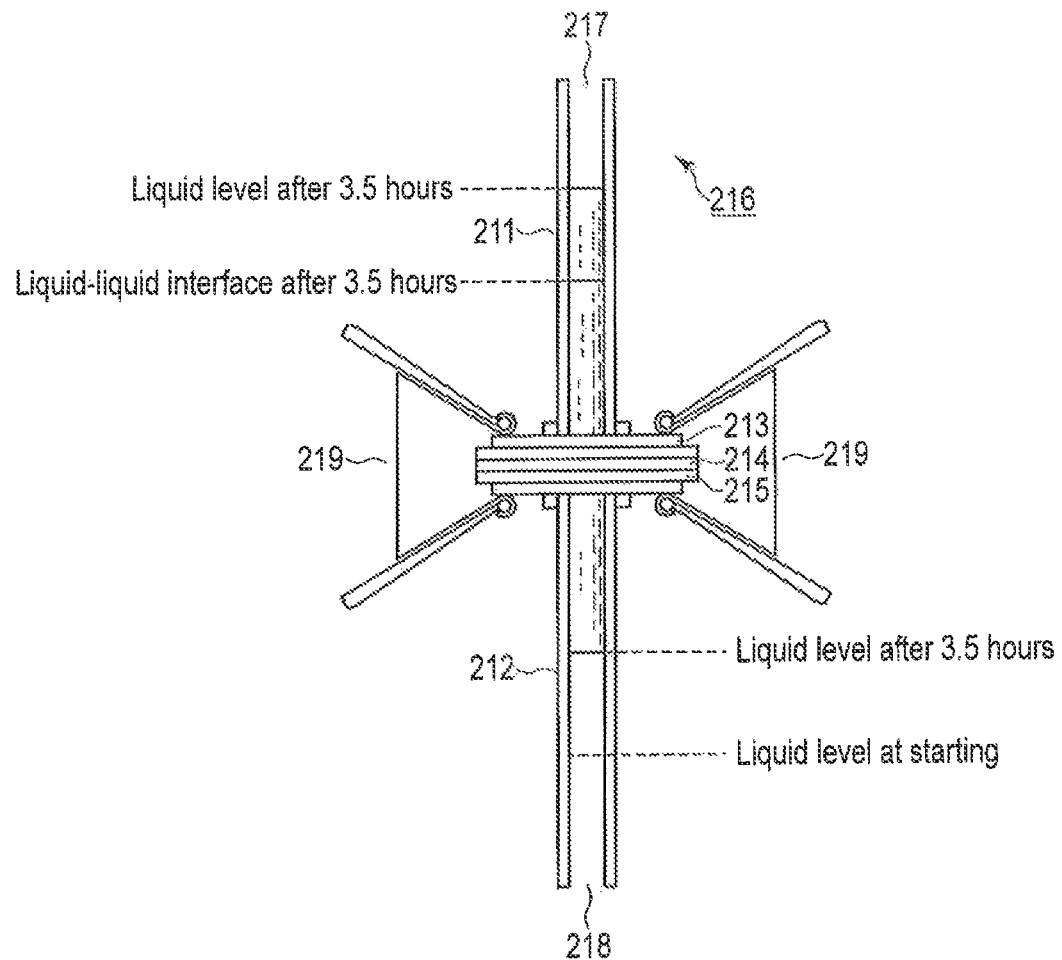
FIG. 15 is a schematic diagram showing a result of the syringe test.

FIG. 15 schematically shows the state of the syringe test device 216 containing PF1P and water for 3.5 hours from the start of the test. The results of the further test are shown in FIG. 16.

As shown in FIG. 15, in the syringe test device 216, the second syringe 212, the second rubber 215, the osmosis membrane 214, the first rubber 213 and the first syringe 211 are stacked one on another in this order from the lower side, and they are fixed together with two clips 219 at the grip portion of the syringe. 3.5 hours after the start of the test, it was observed that water observed into the first syringe 211 is separated as an upper layer of the liquid. At this point, the liquid-liquid interface between PF1P and water was clearly observed. As described, in the vertically standing syringe test, fresh water absorbed from the second syringe to the first syringe 211 passes through the osmosis membrane 214 and moves into the first syringe 211, and then ascends in PF1P. The liquid eventually separates into phases, and fresh water comes up as an upper layer of the PF1P phase.

Figure 16:
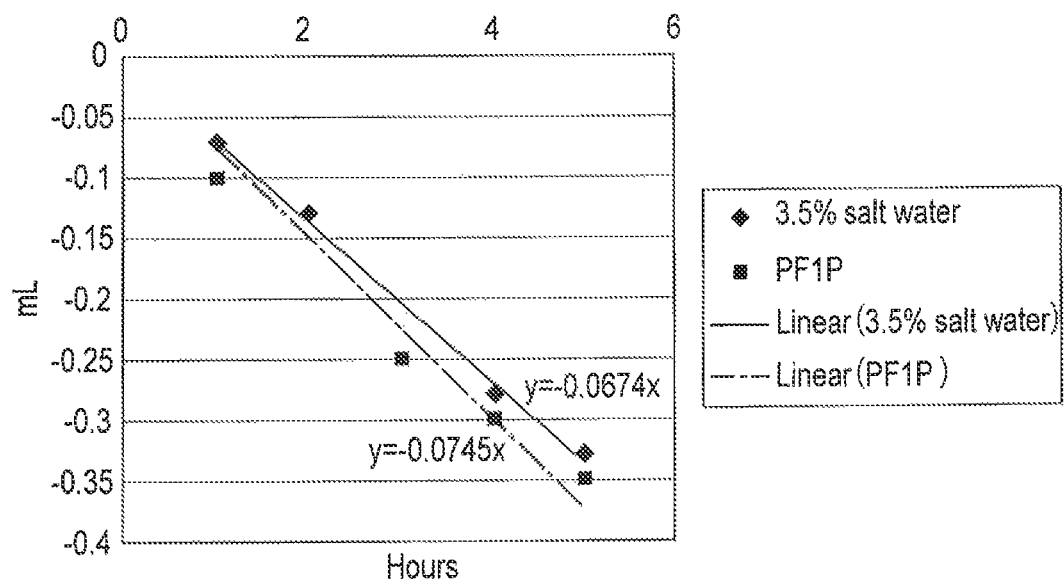
FIG. 16 is a graph showing a result of the syringe test.

In FIG. 16, the horizontal axis represents observation time in hours, whereas the vertical axis represents the amount of water moving from the second syringe 216 to the first syringe 211. The amount of water was measured by reading the calibration markings indicated on the second syringe 212 and directly recording the read marks. From the graph, it can be understood that when PF1P was contained in the first syringe 211, fresh water in the second syringe 212 was absorbed into the second syringe 212 at a rate of 1.1 times higher than that of the case where sea water was used. Further, when comparing in terms of the initial rate, PF1P absorbed fresh water at a rate 1.4 times higher than that of the case of sea water.

TABLE 2 shows calculated osmotic pressures of PF1P and ethanol.

TABLE 2

| Component A (MW) | Component B (MW) | Wt. % of B | Solute per 1 L (mol) | Osmotic pressure (atm) |
|---|---|---|---|---|
| Water (18) | Ethanol (46.07) | 50 | 10.85 | 265 |
| Water (18) | Ethanol (46.07) | 100 | 21.71 | 530 |
| Water (18) | 2,2,3,3,3-pentafluoro-1-propanol (150.05) | 50 | 3.33 | 81 |
| Water (18) | 2,2,3,3,3-pentafluoro-1-propanol (150.05) | 100 | 6.66 | 163 |

As is clear from TABLE 2, PF1T has an osmotic pressure lower than that of ethanol. Nevertheless, as demonstrated here, if the surface of the osmosis membrane is placed horizontally with respect to the installation surface, and also the first chamber containing the PF1P phase is situated above the second chamber containing the water phase, a larger flux can be created than that with ethanol. Here, the flux is indicated by the movement distance of liquid per unit area and its unit is "m/h". This is a remarkable discovery, and it is considered that the cause for this phenomenon is the specific gravity. It is generally judged that a material which absorbs water quicker when brought into contact with water via an osmosis membrane is a superior material. However, in the osmosis membrane phenomenon, such a material as evaluated superior absorbs particularly water so quickly that the absorbed portion of water remains near the osmosis membrane. Such remainder of water causes concentration polarization on a water-absorbing chamber side. When this phenomenon occurs, the flux significantly decreases. As a matter of fact, in many test cases, the significant decrease in flux due to the concentration polarization was observed. In these cases, the flux can be recovered by stirring the inside of the water-absorbing chamber with a screw. Conventionally, the cross-flow mode, which creates a continuous liquid flow along the surface of the osmosis membrane, has been proposed in order to avoid such a phenomenon. In the case of ethanol, the decrease in flux due to the concentration polarization takes place. However, the results of this test demonstrate that the working medium of each of the embodiments exhibits a unique effect of preventing concentration polarization spontaneously without requiring the stirring with a screw or the cross-flow mode.

That is, it is considered that the following mechanism is involved here. In the case of the working medium of each of the embodiments, the specific gravity of PF1P, which is a fluorine-based solvent, is large as 1.5 or more, it sinks underneath the water phase spontaneously. Therefore, to the surface of the osmosis membrane on the PF1P-containing chamber, fresh new PF1P liquid is supplied at all time. Therefore, in the case of PF1P, the decrease in flux due to concentration polarization does not easily occur, a flow of liquid contained the inducing-liquid and the water is continuously produced by a large suction force. Thus, the operation efficiency can be improved. Further, the mechanism for preventing concentration polarization is not required.

Further, as demonstrated above, the working medium of each of the embodiments can be separated into phases without heating. Therefore, after the turbine is rotated for the osmotic pressure electric power generation, the solution is stored and let stand as it is to be recycled. Thus, after recycled, water and an inducing-liquid such as PF1P are suctioned up from the respective separated liquid phases directly by pipes, and the liquids are transferred to the osmotic pressure generator 1. In this manner, it is possible to easily carry out circular osmotic pressure electric power generation.

As described above, it has been provided that when PF1P as the inducing-liquid and water are brought into contact with each other via a osmosis membrane, water is suctioned to PF1P and also the mixture can be separated into water phase and inducing-liquid phase, PF1P only by letting it stand at a temperature of 25° C. It has been also demonstrated that a working medium containing a material having a specific gravity of 1.1 or more and also a low mutual solubility to water and water can maintain an osmotic pressure difference spontaneously and also can be recycled merely by letting it stand at normal temperature. Thus, it is suggested that a circular osmotic pressure electric power generation system with excellent cost performance can be provided.

(3) Phase Control Test

Example 2

Figure 17:
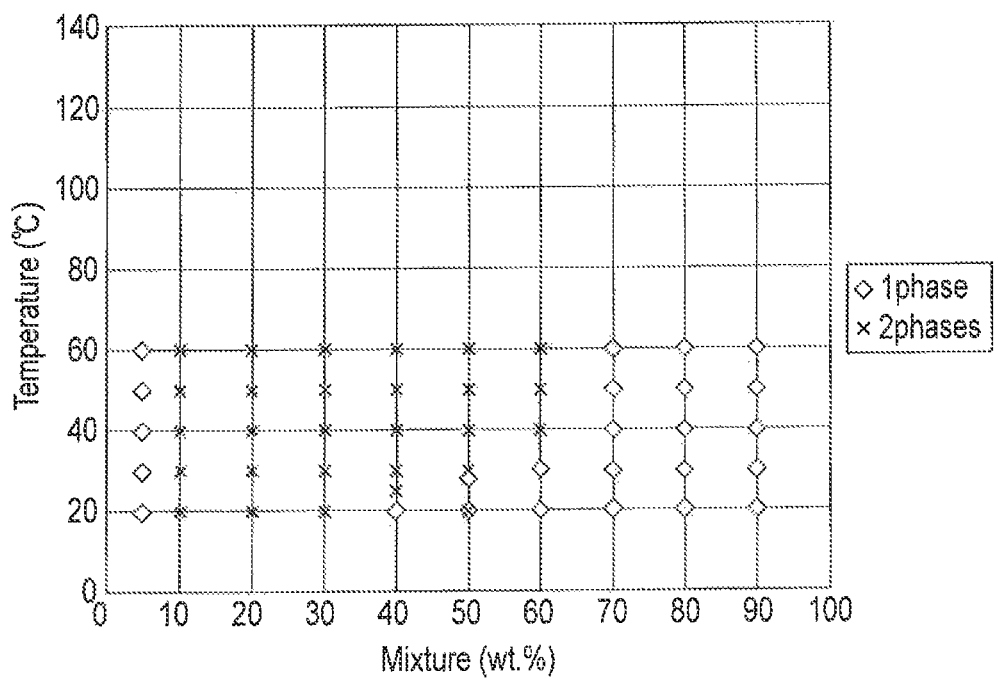
FIG. 17 is a graph showing a result of a phase control test.

First, 2BE and PF1P were mixed at a ratio of 90:10 such that the concentration by weight of 2BE in PF1P was 10% by weight, and thus the working medium was obtained as an inducing-liquid. The inducing-liquid and water were mixed at various ratios and thus the working media were obtained. More specifically, water and the inducing-liquid were mixed to have various concentrations in weight of the inducing-liquid in the working media of 5, 10, 20, 30, 40, 50, 60, 70, 80 and 90% by weight. That is, the mixture ratio between the mixture and water was varied by 10% by weight. The working media having various concentrations thus obtained were heated from a low temperature, and the change in phase was observed to form phase diagrams. FIG. 17 shows these phase diagrams obtained.

As can be seen from the results, there was a region where the phase separation occurred even at 20° C. FIG. 18 is a diagram in which this result was superimposed on the phase diagram of the 2BE aqueous solution. FIG. 19 shows the relationship between the difference in osmotic pressure and the temperature in this case.

From FIG. 18, it can be understood that the lower critical temperature of 2BE greatly decreased, and in particular, at maximum, dropped by 30° C. When this solution is used, the osmotic pressure by calculation (see TABLE 3) increases as the two-phase region is expanded in the phase diagram as shown in FIG. 18, suggesting that an output 3.6 times stronger than that of sea water can be expected. That is, not only enlarging the temperature zone, but also the increase in output can be expected. This is even clearer from the graph of FIG. 19 which shows the relationship between the difference in osmotic pressure and the temperature.

TABLE 3

| Component A (MW) | Component B (MW) | Wt. % of B | Solute per 1 L (mol) | Osmotic pressure (atm) |
|---|---|---|---|---|
| Water (18) | 2BE(118.17) + PF1P (150.06) | 62 | 5.14 | 125 |
| Water (18) | 2BE(118.17) + PF1P (150.06) | 11 | 0.91 | 22 |
| Difference in osmotic pressure in osmotic pressure generator | | | 4.22 | 103 |
| Water (18) | NaCl | 3.5 | 0.59 | 29 |

Example 3

Figure 20:
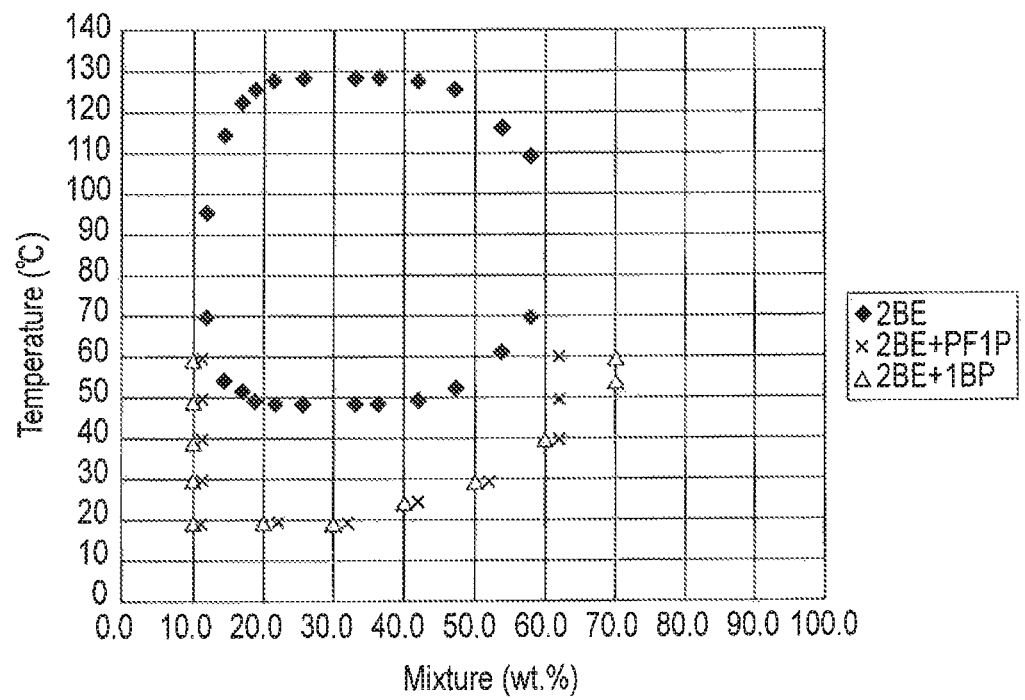
FIG. 20 is a graph showing a result of a phase control test.
Figure 21:
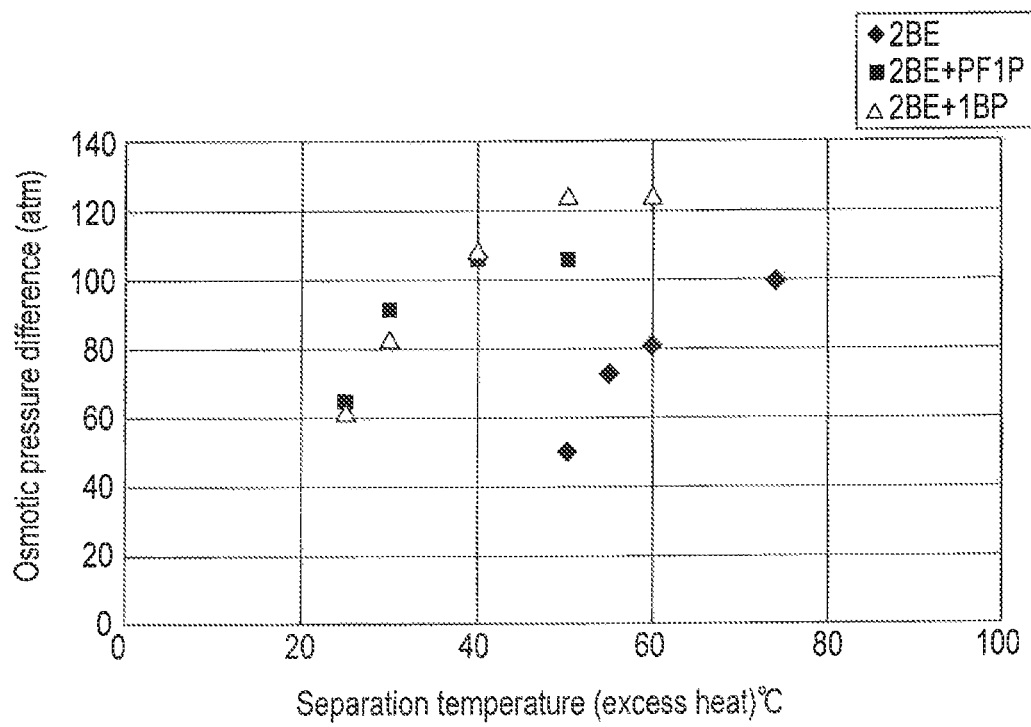
FIG. 21 is a graph showing a result of a phase control test.

As in Example 2, 1-bromopropane (1BP) was mixed with 2BE at 10% by weight and thus the working medium was obtained as an inducing-liquid. The inducing-liquid was mixed with water to prepare a working medium, and the phase diagram was formed with regard to the working medium. With water as a solvent, the working media were prepared by mixing such that the inducing-liquids have concentrations by weight of 10, 20, 30, 40, 50, 60 and 70% by weight. The working media having various concentrations thus obtained were heated from a low temperature, and the change in phase was observed to form phase diagrams. FIG. 20 shows these phase diagrams obtained. FIG. 21 shows the relationship between the difference in osmotic pressure and the temperature in this case.

From these results, it is clear that when 1BP is mixed with 2BE, the temperature zone can be expanded effectively as in the case of PF1P, and further the two-phase region is expanded in the direction of concentration as well. As is clear from FIG. 21 as well, the difference in osmotic pressure is large in a temperature zone of 50 to 59° C., and therefore a high output can be expected. This is even clearer from TABLE 4 which indicates the osmotic pressures obtained by calculation. As can be seen from TABLE 4, the difference in osmotic pressure obtained at this point is 122 atmospheres. This large output is 4.2 times larger than that of sea water at maximum.

TABLE 4

| 50° C. | | | | |
|---|---|---|---|---|
| Component A (MW) | Component B (MW) | Wt % of B | Solute per 1 L (mol) | Osmotic pressure (atm) |
| Water (18) | 2BE(118.17) + 1BP (122.9) | 70 | 5.90 | 144 |
| Water (18) | 2BE(118.17) + 1BP (122.9) | 11 | 0.93 | 23 |
| Difference in osmotic pressure in osmotic pressure generator | | | 4.97 | 122 |
| Water (18) | NaCl | 3.5 | 0.59 | 29 |

Example 4

Tribromoethanol (TBE) is known as a material which precipitates in the form of solid in its aqueous solution. A test was carried out, in which the phase diagram of TBE was to be changed with the use of the phase controlling agent. First, control mixture liquids were prepared. More specifically, water and TBE were mixed such that the mixtures of water and TBE have TBE concentrations by weight of 10, 20, 30, 40, 50, 60, 70, 80 and 90% by weight, and the control mixture liquids were prepared. The control mixture liquids thus obtained were heated from a low temperature, and the change in phase was observed. Based on the change observed, a phase diagram was formed for each case. FIG. 22 shows the obtained phase diagrams of the mixture liquids of TBE and water. When a solid matter precipitates at normal temperature, there arises a problem of damaging the osmosis membrane by the solid. In order to solve this problem, tests were carried out for the phase control.

Next, ethanol as a phase controlling agent was added to TBE in the same weight as that of TBE. The mixture obtained by mixing ethanol and TBE was mixed with water. With water as the solvent, the thus obtained mixtures have concentrations by weight of ethanol-TBE mixtures 5, 10, 20, 30, 40, 50, 60, 70, 80 and 90% by weight. The mixtures with these concentrations were heated from a low temperature, and the change in phase was observed. FIG. 22 shows the obtained phase diagrams.

The control phase diagram of FIG. 22 and the phase diagram of FIG. 23 were compared with each other. It is clear that the phase diagram of FIG. 23 obtained by adding ethanol as the phase controlling agent differs from the control in which the phase controlling agent was not added. More specifically, when ethanol was added, a mixture having a typical upper critical boundary was obtained.

Example 5

An inducing-liquid was prepared by adding ethanol to tribromoethanol at 50% by weight. According to the procedure described in (1) above, a syringe test device 216 in which this inducing-liquid was contained in the first syringe 211 and fresh water was contained the second syringe 212 was prepared. Then, the syringe test device was placed such that the first syringe 211 was situated above the second syringe 212, and fixed vertically with respect to the installation surface, and let stand under conditions of 20° C. and 1 atmosphere (that is, the syringe vertically stands). After that, the movement of water was measured by reading calibration markings every hour.

Figure 24:
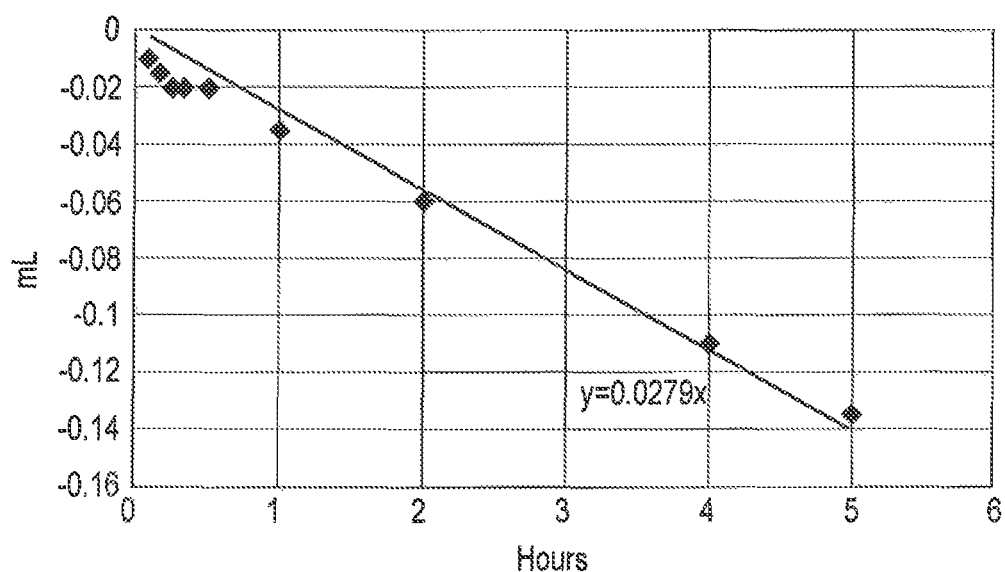
FIG. 24 is a graph showing a result of a phase control test.

The results are shown in FIG. 24. As is clear from FIG. 24, the flow rate was 0.028 mL/h and the flux was 0.0014 m/h. It is known that 100% ethanol exhibits a flux of 0.0015 at 25° C., and the obtained flow is apparently close to this value. In the meantime, even at 20° C., the separation of water content expected from the phase diagram was not observed at 5 hours. For comparison, a similar syringe test was carried out at 50° C. with water added to TBE. In this case, the obtained flux was 0.0031 m/h (91% of 3.5% NaCl aqueous solution). But, during the test, the precipitated crystals did not dissolve or a homogeneously working medium was not obtained.

As described above, when a compound which mutually dissolves therewith is added to a compound which is hard to be used as an inducing-liquid, which is further mixed with water, a liquid having a phase which can be used as a working medium can be produced. With such a phase control, materials which are conventionally not able to or hard to be used for osmotic pressure electric power generation, can be converted into those usable osmotic pressure electric power generation. Or those conventionally usable for osmotic pressure electric power generation can be remodeled into materials with advantageous effect. With this improvement, a circular osmotic pressure electric power generation system with excellent cost performance can be provided.

Unlike the osmotic pressure electric power generation by river water and sea water, the circular osmotic pressure electric power generation system of the embodiments are used in a closed circular system isolated from the external environment, and therefore the membrane and the electric power generation apparatus are free from the biological contamination. Therefore, the life of the membrane can be prolonged, and thus the cost required for maintenance can be suppressed low. As a result, a further low cost can be achieved.

For example, such an intermediate maintenance as backwashing can be greatly cut down, and therefore the driving time can be prolonged, and the operating rate can be increased. Since the working medium does not involve gaseous ammonia, designing the system is easy and simple. At the same time, a multi-stage distillation system is not required. The working media of the embodiments are separated into phases spontaneously for recycle merely by letting it stand at a temperature lower than the conventional cases. Therefore, each of the liquid phases of the working media subjected to the liquid-liquid phase separation can be directly collected by the respective pipe. Further, with use of the phase control of the embodiment, an optimal material can be selected out of those having similar properties as the working media, and therefore the degree of freedom in system designing can be widened. For example, ammonium is corrosive and highly poisonous, but it is still possible to improve a system which involves ammonium. Thus, it is possible to increase the possibility in selection of safer materials. Each of these advantages is considered to be effective to provide a circular osmotic pressure electric power generation system at low cost.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A working medium for using a circular osmotic pressure electric power generation system,
   wherein the working medium comprises a water and an inducing-liquid, the inducing-liquid comprising 2-butoxyethanol and 2,2,3,3,3-pentafluoro-1-propanol which has a mechanism as a phase controlling agent with respect to the 2-butoxyethanol, under conditions of a temperature of 5° C. to 35° C. and a pressure of 1 atmosphere, the working medium is in:
   (1) a state in which the including-liquid is mutually dissolved with the water when a concentration of the water in a total amount of the water and the inducing-liquid is 10% by weight or lower, or a concentration of the inducing-liquid in the total amount of the water and the inducing-liquid is 10% by weight or lower; and
   (2) a state in which the water and the inducing-liquid are separated from one another when the concentration of the water in the total amount of the water and the inducing-liquid is higher than 10% by weight, or the concentration of the inducing-liquid in the total amount of the water and the inducing-liquid is higher than 10% by weight, and the circular osmotic pressure electric power generation system comprises an osmotic pressure generator comprising a first chamber to accommodate an inducing-liquid, a second chamber to accommodate a water and a osmosis membrane interposing between the first chamber and the second chamber, configured to generate electric power by driving a turbine by a flow of liquid in which the inducing-liquid is mutually dissolved with the water, wherein the flow of liquid is produced by a difference in osmotic pressure.

* * * * *